United States Patent
Miyauchi

(10) Patent No.: US 12,108,182 B2
(45) Date of Patent: Oct. 1, 2024

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventor: Ken Miyauchi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 137 days.

(21) Appl. No.: 18/097,938

(22) Filed: Jan. 17, 2023

(65) Prior Publication Data
US 2023/0232133 A1    Jul. 20, 2023

(30) Foreign Application Priority Data
Jan. 17, 2022    (JP) .................... 2022-005139

(51) Int. Cl.
*H04N 25/778* (2023.01)
*H04N 25/78* (2023.01)

(52) U.S. Cl.
CPC .......... *H04N 25/778* (2023.01); *H04N 25/78* (2023.01)

(58) Field of Classification Search
CPC ...... H04N 25/778; H04N 25/78; H04N 25/59; H04N 25/702; H04N 25/704; H04N 25/771; H04N 25/772; H04N 25/79; H04N 25/46
See application file for complete search history.

(56) References Cited

U.S. PATENT DOCUMENTS

| 10,116,889 B2 | 10/2018 | Chen et al. |
| 10,630,928 B2 | 4/2020 | Velichko |
| 2018/0115730 A1 | 4/2018 | Velichko |
| 2020/0137325 A1* | 4/2020 | Mori ............ H04N 25/60 |
| 2022/0060647 A1* | 2/2022 | Lee ............. H04N 25/59 |

(Continued)

FOREIGN PATENT DOCUMENTS

| EP | 3598501 A2 | 1/2020 |
| JP | 2002-501718 A | 1/2002 |

(Continued)

OTHER PUBLICATIONS

European Patent Office, Official Action issued in EP 23152082.6, May 4, 2023, pp. 1-5.

(Continued)

*Primary Examiner* — Shahbaz Nazrul
(74) *Attorney, Agent, or Firm* — Pillsbury Winthrop Shaw

(57) ABSTRACT

Provided are a solid-state imaging device, a method for driving a solid-state imaging device and an electronic apparatus capable not only of having advanced global shutter and autofocus functions but also of sufficiently achieving single exposure high dynamic range (SEHDR) performance, thereby substantially realizing enhanced dynamic range and frame rate.

In an image capturing mode, a reading part controls driving of a conversion signal reading part such that the conversion signal reading part keeps first and second transfer transistors in a conduction state in the same transfer period and performs a read-out operation on a pixel signal corresponding to a sum of charges stored in a first photodiode and charges stored in a second photodiode with a first conversion gain and subsequently with a second conversion gain.

14 Claims, 19 Drawing Sheets

Each pixel has 2 sets of S/H capacitors

(56) References Cited

U.S. PATENT DOCUMENTS

| | | | |
|---|---|---|---|
| 2022/0078362 A1* | 3/2022 | Jung | H04N 25/78 |
| 2022/0191418 A1* | 6/2022 | Jung | H04N 25/532 |
| 2024/0147063 A1* | 5/2024 | Shim | H04N 25/77 |

FOREIGN PATENT DOCUMENTS

| | | | |
|---|---|---|---|
| JP | 2005-065074 A | 3/2005 | |
| JP | 2006-505975 A | 2/2006 | |
| JP | 2021068758 A | 4/2021 | |

OTHER PUBLICATIONS

Aoki et al., "A Rolling-Shutter Distortion-Free 3D Stacked Image Sensor with -160dB Parasitic Light Sensitivity In-Pixel Storage Node", 2013 IEEE International Solid-State Circuits Conference, 2013, pp. 1-3.

* cited by examiner

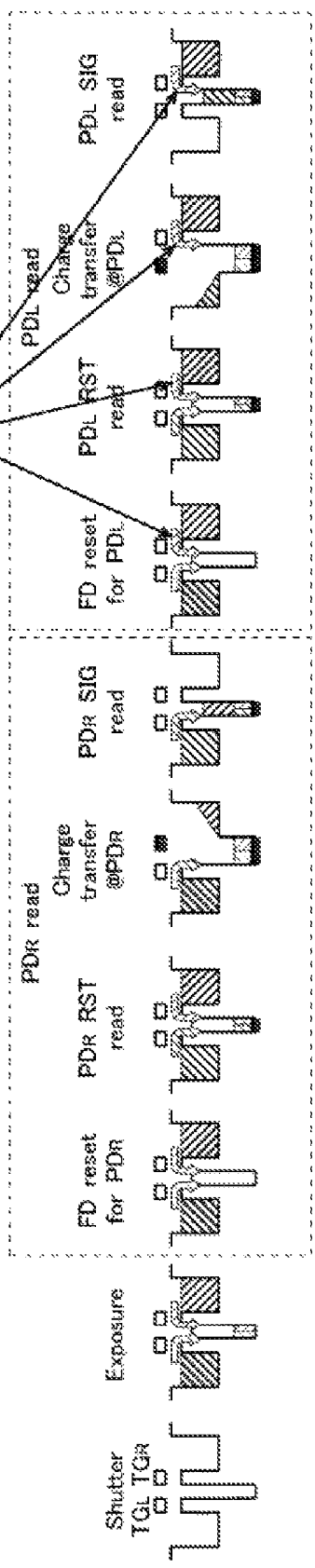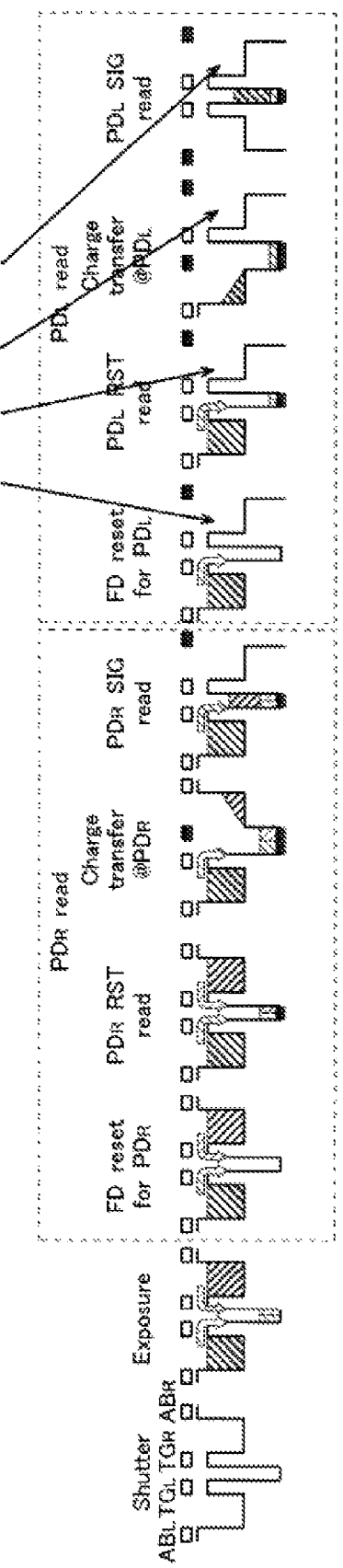

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2022-005139 (filed on Jan. 17, 2022), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use.

The CMOS image sensors have been widely applied as parts of various types of electronic apparatuses such as digital cameras, video cameras, surveillance cameras, medical endoscopes, personal computers (PCs), automotive cameras, mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the read-out operation in the CMOS image sensor is a column parallel output processing of selecting one of the rows in the pixel array and reading the pixels in the selected row simultaneously in the column output direction.

Each pixel of the CMOS image sensor generally includes, for one photodiode for example, four active elements: a transfer transistor serving as a transfer element, a reset transistor serving as a reset element, a source follower transistor serving as a source follower element (an amplification element), and a selection transistor serving as a selection element.

The CMOS image sensor may sequentially scan the pixels or rows one-by-one to read the charges generated by photoelectric conversion and stored in the photodiodes. When such sequential scan is employed, in other words, a rolling shutter is employed as the electronic shutter, it is not possible to start and end the exposure for storing the charges produced by photoelectric conversion at the same time in all of the pixels. Therefore, the sequential scan has such a problem that, when a moving object is imaged, the captured image may experience distortion.

To address this problem, a global shutter is employed as the electronic shutter in a case where image distortion is not acceptable, for example, for the purposes of imaging a fast moving object and sensing that requires simultaneity among the captured images. When the global shutter is employed, the exposure can be started and ended at the same timing in all of the pixels of the pixel array part.

In a CMOS image sensor employing a global shutter as the electronic shutter, each pixel has therein a signal holding part for holding, in a signal holding capacitor, a signal that is read by a reading part, for example. The CMOS image sensor employing a global shutter samples and holds in an analog manner and stores the charges from the photodiodes in the signal holding capacitors of the signal holding parts at the same time in the form of voltage signals and subsequently sequentially read the voltage signals. In this way, the simultaneity is reliably achieved among the images (see, for example, J. Aoki, et al., "A Rolling-Shutter Distortion-Free 3D Stacked Image Sensor with −160 dB Parasitic Light Sensitivity In-Pixel Storage Node" ISSCC 2013/SESSION27/IMAGE SENSORS/27.3.).

Each pixel is configured as, for example, a 4-transistor (4Tr) APS pixel (see, for example, Japanese Patent Application Publication No. 2005-65074 FIG. 2), or a capacitive trans-impedance amplifier (CTIA) pixel (see, for example, Japanese Patent Application Publication (Translation of PCT Application) No. 2006-505975 and Japanese Patent Application Publication (Translation of PCT Application) No. 2002-501718).

CMOS image sensors having a high dynamic range and high image quality include pixels with a global shutter function, which are typified by voltage mode global shutter (VMGS) and charge mode global shutter (CMGS) pixels.

The VMGS pixels advantageously have higher shutter efficiency and lower sensitivity to parasitic light than the CMGS pixels.

In recent years, especially in the fields of machine vision and Internet Of Things (IoT), global shutter (GS) CMOS image sensors (CIS) are in increasing demand. In these technical fields, there is also a strong need for single exposure high dynamic range (SEHDR) performance as well as the GS capability.

Another one of the important features of the CMOS image sensors is automatic focus adjustment (autofocus (AF)) performance. To implement autofocus (AF) function, image capturing devices such as digital cameras employ phase detection such as image area phase detection, according to which some of the pixels in the pixel array part are phase detection pixels for obtaining phase information for the autofocus (AF) purposes. For example, a known technique is designed to obtain phase information by allowing two adjacent ones of the photodiodes PD share a single microlens.

CMOS image sensors have been proposed that have VMGS pixels configured to accomplish the above-mentioned capabilities (see, for example, U.S. Pat. Nos. 10,116,889 B2 and 10,630,928 B2).

As described above, CMOS image sensors (CIS) can employ various characteristic structures in pixels for achieving an improved dynamic range.

As one of the approaches applied to increase the dynamic range, a lateral overflow integration capacitor (LOFIC) can be proposed.

SUMMARY

One of the objects of the present disclosure is to provide a solid-state imaging device, a method for driving a solid-state imaging device and an electronic apparatus capable of not only having advanced global shutter and autofocus but also sufficiently achieving single exposure high dynamic range (SEHDR) performance, thereby substantially realizing enhanced dynamic range.

A first aspect of the present disclosure provides a solid-state imaging device including a pixel part having pixels arranged therein, where each pixel includes a photoelectric conversion reading part and a signal holding part; and a reading part for reading pixel signals from the pixel part. The photoelectric conversion reading part includes: a first photoelectric conversion element for storing therein, in an integration period, charges generated by photoelectric conversion; a second photoelectric conversion element for storing therein, in the integration period, charges generated by photoelectric conversion; a single microlens for allowing light to enter at least a photoelectric conversion region of the first photoelectric conversion element and a photoelectric conversion region of the second photoelectric conversion element; a first transfer element for transferring, in a transfer period following the integration period, the charges stored in the first photoelectric conversion element; a second transfer element for transferring, in a transfer period following the integration period, the charges stored in the second photoelectric conversion element; a floating diffusion to which at least one of (i) the charges stored in the first photoelectric conversion element or (ii) the charges stored in the second photoelectric conversion element are transferred respectively through the first transfer element and the second transfer element; and a conversion signal reading part for changing a capacitance of the floating diffusion between a first capacitance and a second capacitance to change a conversion gain between a first conversion gain corresponding to the first capacitance and a second conversion gain corresponding to the second capacitance, where the conversion signal reading part is configured to amplify a voltage signal resulting from conversion with the conversion gain and output the amplified voltage signal. The signal holding part is configured to capture and hold a pixel signal read onto an in-pixel signal line by the conversion signal reading part, where the pixel signal is the amplified voltage signal. The reading part is configured to read the pixel signal at least in an autofocus mode and in an image capturing mode. The reading part controls driving of the conversion signal reading part such that the conversion signal reading part: in the autofocus mode, keeps the first and second transfer elements in a conduction state in different transfer periods, and separately performs a read-out operation on a pixel signal corresponding to the charges stored in the first photoelectric conversion element and a read-out operation on a pixel signal corresponding to the charges stored in the second photoelectric conversion element with the first conversion gain or the second conversion gain; and in the image capturing mode, keeps the first and second transfer elements in a conduction state in a same transfer period, and performs a read-out operation on a pixel signal corresponding to a sum of the charges stored in the first photoelectric conversion element and the charges stored in the second photoelectric conversion element with the first conversion gain and subsequently with the second conversion gain.

A second aspect of the present disclosure provides a method for driving a solid-state imaging device. The solid-state imaging device includes a pixel part having pixels arranged therein, where each pixel includes a photoelectric conversion reading part and a signal holding part; and a reading part for reading pixel signals from the pixel part. The photoelectric conversion reading part includes: a first photoelectric conversion element for storing therein, in an integration period, charges generated by photoelectric conversion; a second photoelectric conversion element for storing therein, in the integration period, charges generated by photoelectric conversion; a single microlens for allowing light to enter at least a photoelectric conversion region of the first photoelectric conversion element and a photoelectric conversion region of the second photoelectric conversion element; a first transfer element for transferring, in a transfer period following the integration period, the charges stored in the first photoelectric conversion element; a second transfer element for transferring, in a transfer period following the integration period, the charges stored in the second photoelectric conversion element; a floating diffusion to which at least one of (i) the charges stored in the first photoelectric conversion element or (ii) the charges stored in the second photoelectric conversion element are transferred respectively through the first transfer element and the second transfer element; and a conversion signal reading part for changing a capacitance of the floating diffusion between a first capacitance and a second capacitance to change a conversion gain between a first conversion gain corresponding to the first capacitance and a second conversion gain corresponding to the second capacitance, where the conversion signal reading part is configured to amplify a voltage signal resulting from conversion with the conversion gain and output the amplified voltage signal. The signal holding part is configured to capture and hold a pixel signal read onto an in-pixel signal line by the conversion signal reading part, where the pixel signal is the amplified voltage signal. The reading part is configured to read the pixel signal at least in an autofocus mode and in an image capturing mode. In the autofocus mode, the first and second transfer elements are kept in a conduction state in different transfer periods, and a read-out operation on a pixel signal corresponding to the charges stored in the first photoelectric conversion element and a read-out operation on a pixel signal corresponding to the charges stored in the second photoelectric conversion element are separately performed with the first conversion gain or the second conversion gain, and in the image capturing mode, the first and second transfer elements are kept in a conduction state in a same transfer period, and a read-out operation is performed on a pixel signal corresponding to a sum of the charges stored in the first photoelectric conversion element and the charges stored in the second photoelectric conversion element with the first conversion gain and subsequently with the second conversion gain.

A third aspect of the present disclosure provides an electronic apparatus including a solid-state imaging device; and an optical system for forming a subject image on the solid-state imaging device. The solid-state imaging device includes: a pixel part having pixels arranged therein, where each pixel includes a photoelectric conversion reading part and a signal holding part; and a reading part for reading a pixel signal from the pixel part. The photoelectric conversion reading part includes: a first photoelectric conversion element for storing therein, in an integration period, charges generated by photoelectric conversion; a second photoelectric conversion element for storing therein, in the integration period, charges generated by photoelectric conversion; a single microlens for allowing light to enter at least a photoelectric conversion region of the first photoelectric conversion element and a photoelectric conversion region of the second photoelectric conversion element; a first transfer element for transferring, in a transfer period following the integration period, the charges stored in the first photoelectric conversion element; a second transfer element for transferring, in a transfer period following the integration period, the charges stored in the second photoelectric conversion element; a floating diffusion to which at least one of (i) the charges stored in the first photoelectric conversion element or (ii) the charges stored in the second photoelectric conversion element are transferred respectively through the first transfer element and the second transfer element; and a conversion signal reading part for changing a capacitance of the floating diffusion between a first capacitance and a second capacitance to change a conversion gain between a first conversion gain corresponding to the first capacitance and a second conversion gain corresponding to the second capacitance, where the conversion signal reading part is configured to amplify a voltage signal resulting from conversion with the conversion gain and output the amplified voltage signal. The signal holding part is configured to capture and hold a pixel signal read onto an in-pixel signal line by the conversion signal reading part, where the pixel signal is the amplified voltage signal. The reading part is configured to read the pixel signal at least in an autofocus mode and in an image capturing mode. The reading part controls driving of the conversion signal reading part such that the conversion signal reading part: in the autofocus mode, keeps the first and second transfer elements in a conduction state in different transfer periods, and separately performs a read-out operation on a pixel signal corresponding to the charges stored in the first photoelectric conversion element and a read-out operation on a pixel signal corresponding to the charges stored in the second photoelectric conversion element with the first conversion gain or the second conversion gain; and in the image capturing mode, keeps the first and second transfer elements in a conduction state in a same transfer period, and performs a read-out operation on a pixel signal corresponding to a sum of the charges stored in the first photoelectric conversion element and the charges stored in the second photoelectric conversion element with the first conversion gain and subsequently with the second conversion gain.

Advantageous Effects

The present disclosure can provide not only for advanced global shutter and autofocus functions but also sufficiently achieving single exposure high dynamic range (SEHDR) performance, thereby substantially realizing enhanced dynamic range.

BRIEF DESCRIPTION OF THE DRAWINGS

FIGS. 16A and 16B are used to illustrate effects, in terms of the potential transition, produced by the second embodiment of the present disclosure where the two shutter gates are arranged, in comparison with the effects produced in a case where no shutter gates are provided.

DESCRIPTION OF THE PREFERRED EMBODIMENTS

Embodiments of the present invention will be hereinafter described with reference to the drawings.

First Embodiment

Figure 1:
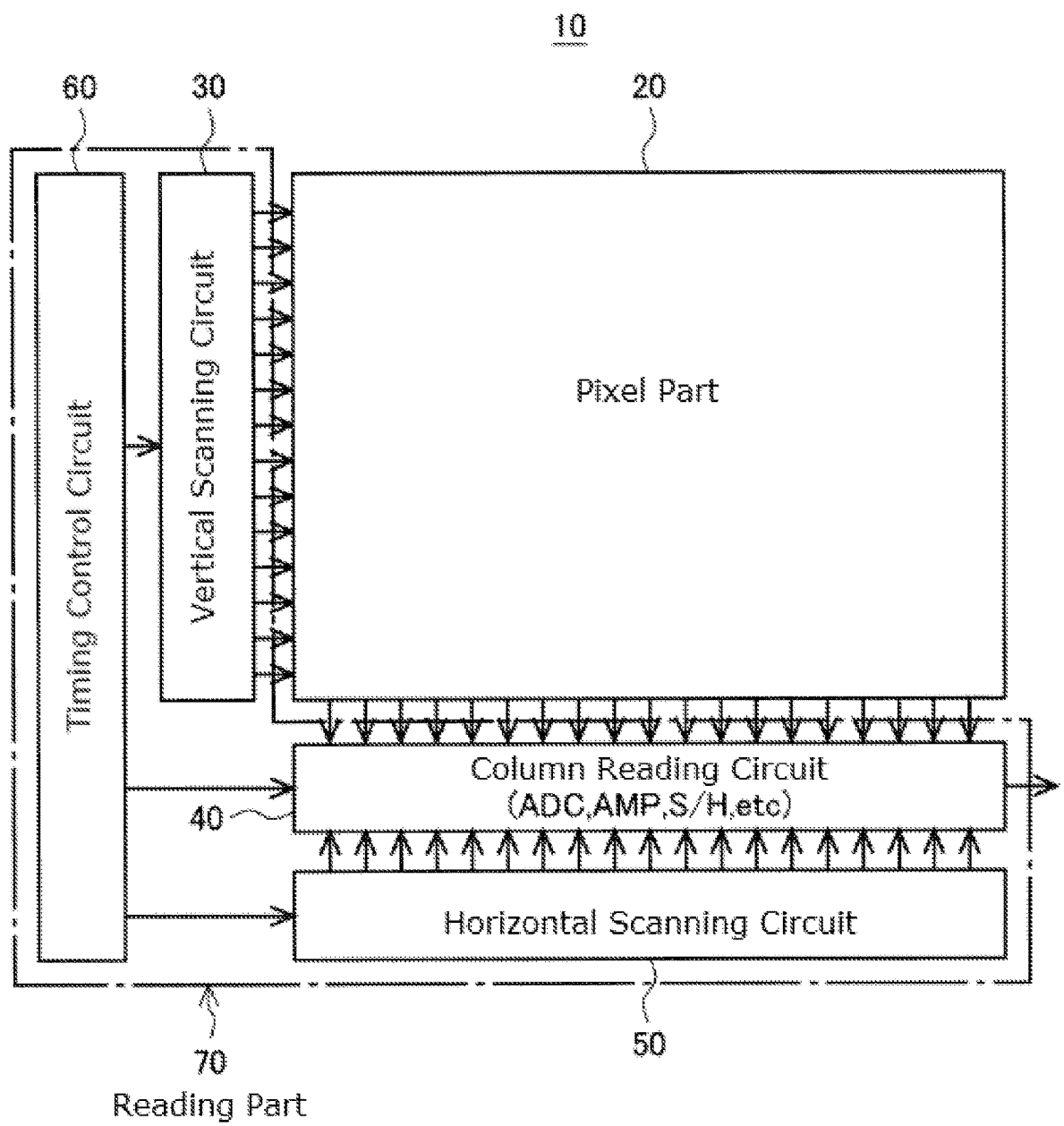
FIG. 1 is a block diagram showing an example configuration of a solid-state imaging device according to a first embodiment of the present invention.
Figure 2:
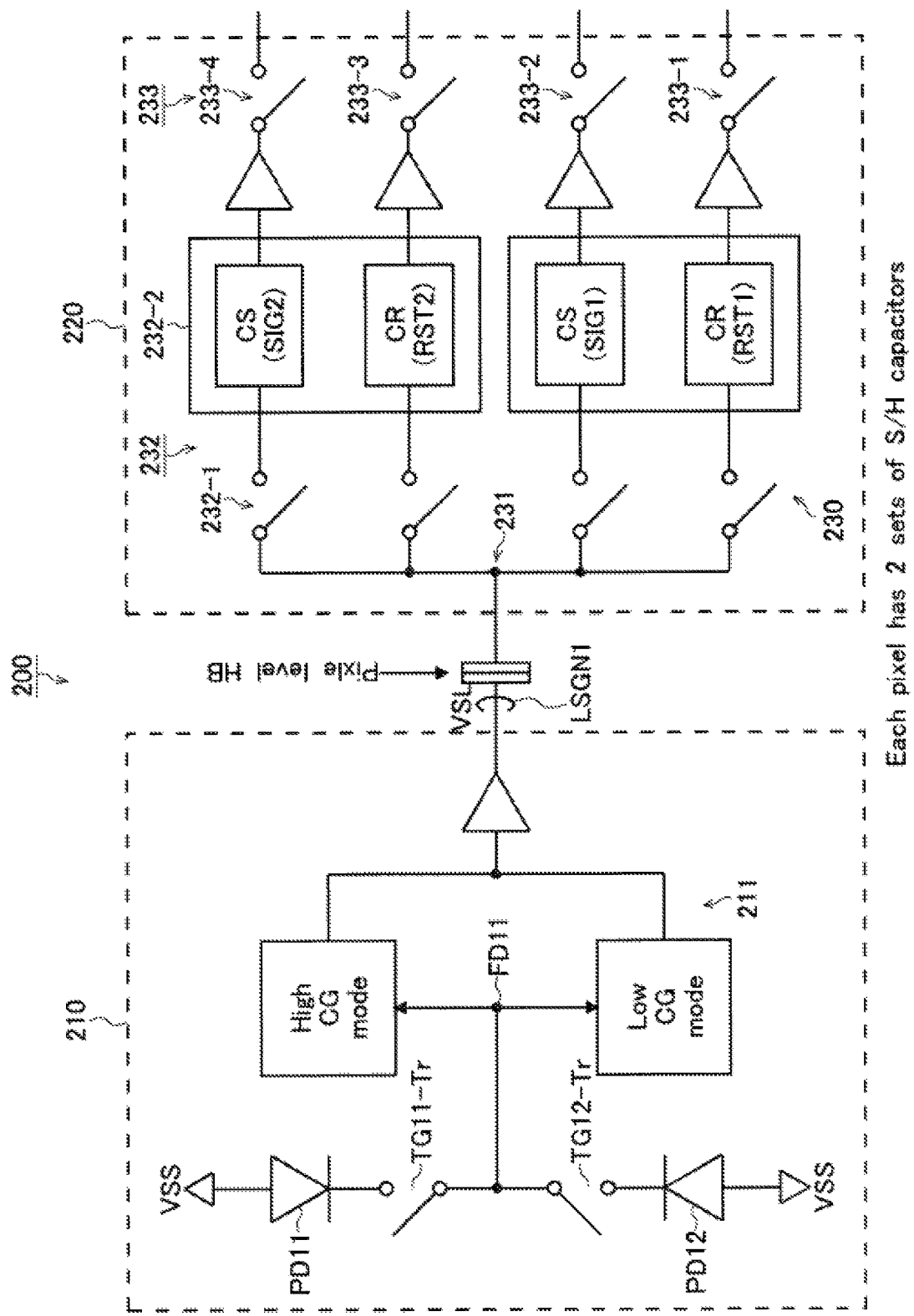
FIG. 2 is a block diagram showing an example basic configuration of a pixel of the solid-state imaging device according to the first embodiment of the present invention.

FIG. 1 is a block diagram showing an example configuration of a solid-state imaging device relating to a first embodiment of the present invention. FIG. 2 is a block diagram showing an example basic configuration of a pixel in the solid-state imaging device relating to the first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading out pixel signals.

In the solid-state imaging device 10 relating to the first embodiment, the pixel part 20 includes pixels 200 arranged in a matrix pattern, and each pixel 200 includes a photoelectric conversion reading part 210 and a signal holding part 220. The solid-state imaging device 10 is configured, for example, as a stacked CMOS image sensor capable of operating in a global shutter (GS) mode, having an autofocus (AF) function, and substantially achieving a high dynamic range and an enhanced frame rate.

The photoelectric conversion reading part 210 includes, as shown in FIG. 2, a first photodiode PD11 serving as a first photoelectric conversion element for storing charges generated by photoelectric conversion in an integration period, a second photodiode PD12 serving as a second photoelectric conversion element for storing charges generated by photoelectric conversion in an integration period, and a single microlens (not shown in FIG. 2) for allowing light to enter at least the photoelectric conversion regions of the first and second photodiodes PD11 and PD12.

In the first embodiment, for example, some of the pixels in the pixel part 20 employ phase detection to obtain phase information for autofocus (AF). For example, the first embodiment is characterized to obtain phase information by allowing two adjacent ones of the photodiodes PD to share a single microlens.

A to-be-read pixel or the photoelectric conversion reading part 210 includes a first transfer transistor TG11-Tr serving as a first transfer element, a second transfer transistor TG12-Tr serving as a second transfer element, and a floating diffusion FD11. The charges stored in the first photodiode PD11 can be transferred to the first transfer transistor TG11-Tr in a transfer period following the integration period. The charges stored in the second photodiode PD12 can be transferred to the second transfer transistor TG12-Tr in a transfer period following the integration period. At least one of (i) the charges stored in the first photodiode PD11 or (ii) the charges stored in the second photodiode PD12 can be transferred to the floating diffusion FD11 respectively via the first transfer transistor TG11-Tr and the second transfer transistor TG12-Tr.

The photoelectric conversion reading part 210 further includes a conversion signal reading part 211 for changing the capacitance of the floating diffusion FD11 between a first capacitance and a second capacitance to change a conversion gain between a first conversion gain corresponding to the first capacitance (for example, high conversion gain: HCG) and a second conversion gain corresponding to the second capacitance (for example, low conversion gain: LCG). The conversion signal reading part 211 amplifies a voltage signal resulting from the conversion with the conversion gain and outputs the amplified voltage signal an internal signal line LSGN1.

In the first embodiment, the reading part 70 can control reading of a pixel signal VSL, so that the pixel signal VSL can be read in an autofocus mode MDAF, an image capturing mode MDIC, or a dual conversion gain readout mode MDDCG. In the autofocus mode MDAF, the reading part 70 controls driving of the conversion signal reading part 211 such that the conversion signal reading part 211 keeps the first and second transfer transistors TG11-Tr and TG12-Tr in a conduction state in different transfer periods and that it separately performs a read-out operation on a pixel signal corresponding to the charges stored in the first photodiode PD11 and a read-out operation on a pixel signal corresponding to the charges stored in the second photodiode PD12 respectively with the first conversion gain HCG and the second conversion gain LCG. In the image capturing mode MDIC and the dual conversion gain read-out mode MDDCG, the reading part 70 controls driving of the conversion signal reading part 211 such that the conversion signal reading part 211 keeps the first and second transfer transistors TG11-Tr and TG12-Tr in the conduction state in the same transfer period and that it performs a read-out operation on a pixel signal corresponding to the sum of the charges stored in the first photodiode PD11 and the charges stored in the second photodiode PD12 with the first conversion gain HCG and subsequently with the second conversion gain LCG.

The signal holding part 220 is configured to capture and hold the pixel signal, which is a voltage signal read onto the in-pixel signal line LSGN1 by the conversion signal reading part 211. In the first embodiment, the signal holding part 220 includes a sample-and-hold circuit 230 configured to capture and hold, in response to a sampling signal, the voltage signal. The voltage signal corresponds to the charges stored in the first and second photodiodes PD11 and PD12 that have been transferred to the floating diffusion FD11 of the photoelectric conversion reading part 210 and is treated as a pixel signal read out onto the internal signal line LSGN1. Specifically, the sample-and-hold circuit 230 includes an input part 231, a sample-and-hold part 232, and an output part 233 (233-1 to 233-4). The sample-and-hold part 232 includes a sampling switch part 232-1 and a holding capacitor part 232-2. The sampling switch part 232-1 is configured to sample, in response to a sampling signal, two sets of pixel signals produced with different conversion gains, where each set of pixel signals includes a read-out reset signal and a read-out pixel signal. The holding capacitor part 232-2 includes holding capacitors (CS, CR) for holding in parallel the read-out pixel signals sampled by the sampling switch part 232-1. The output parts 233-1 to 233-4 are configured to selectively output, to vertical signal lines LSGN11 to 14, the read-out pixel signals held in the signal holding capacitor part 232-2.

In the first embodiment, the pixel signal VSL read by the photoelectric conversion reading part 210 includes a read-out reset signal VRST and a read-out luminance signal VSIG. Specifically, in the first embodiment, a pixel signal VSL11 read by the photoelectric conversion reading part 210 in the autofocus mode MDAF includes (i) a first conversion gain read-out reset signal HCGRST1 (or a second conversion gain read-out reset signal LCGRST1) and a first conversion gain read-out luminance signal HCGSIG1 (or a second conversion gain read-out luminance signal LCGSIG1) corresponding to the charges stored in the first photodiode PD11 and (ii) a first conversion gain read-out reset signal HCGRST2 (or a second conversion gain read-out reset signal LCGRST2) and a first conversion gain read-out luminance signal HCGSIG2 (or a second conversion gain read-out luminance signal LCGSIG2) corresponding to the charges stored in the second photodiode PD12.

A pixel signal VLS12 read by the photoelectric conversion reading part 210 in the image capturing mode MDIC includes a first conversion gain read-out reset signal HCGRST11, a first conversion gain read-out luminance signal HCGSIG11, a second conversion gain read-out luminance signal LCGSIG11 and a second conversion gain read-out reset signal LCGRST12 corresponding to the sum of the charges stored in the first and second photodiodes PD11 and PD12.

In the image capturing mode MDIC, the reading part 70 resets the floating diffusion FD11, the storage capacitance element (storage capacitor), the first photodiode PD11 and the second photodiode PD12 and switches the first and second transfer transistors TG11-Tr and TG12-Tr into the non-conduction state, so that an exposure period starts. After this, the reading part 70 sequentially performs a first conversion gain reset read-out operation, a first conversion gain signal read-out operation, a second conversion gain reset read-out operation, and a second conversion gain signal read-out operation.

In the dual conversion gain read-out mode MDDCG, the reading part 70 resets the floating diffusion FD11, the storage capacitance element (storage capacitor), the first photodiode PD11 and the second photodiode PD12 and switches the first and second transfer transistors TG11-Tr and TG12-Tr into the non-conduction state, so that an exposure period starts. After this, the reading part 70 sequentially performs a second conversion gain reset read-out operation, a first conversion gain reset read-out operation, a first conversion gain signal read-out operation, and a second conversion gain signal read-out operation.

In the solid-state imaging device 10 relating to the first embodiment, in a voltage mode, the pixel signal is sampled into the signal holding part 220 serving as a pixel signal storage, which takes place in all of the pixels at the same time. Conversion signals corresponding to the read-out signals held in first to fourth signal holding capacitors are read out to predetermined signal lines, and conversion signals corresponding to the read-out reset signals are read out to predetermined signal lines in parallel and simultaneously. The conversion signals are fed to the column reading circuit 40.

The following outlines the configurations and functions of the parts of the solid-state imaging device 10. In particular, the configurations and functions of the pixel part 20 and the relating read-out operation will be described in detail, and other features will be also described in detail.

(Configurations of Pixel and Pixel Part 20)

Figure 3:
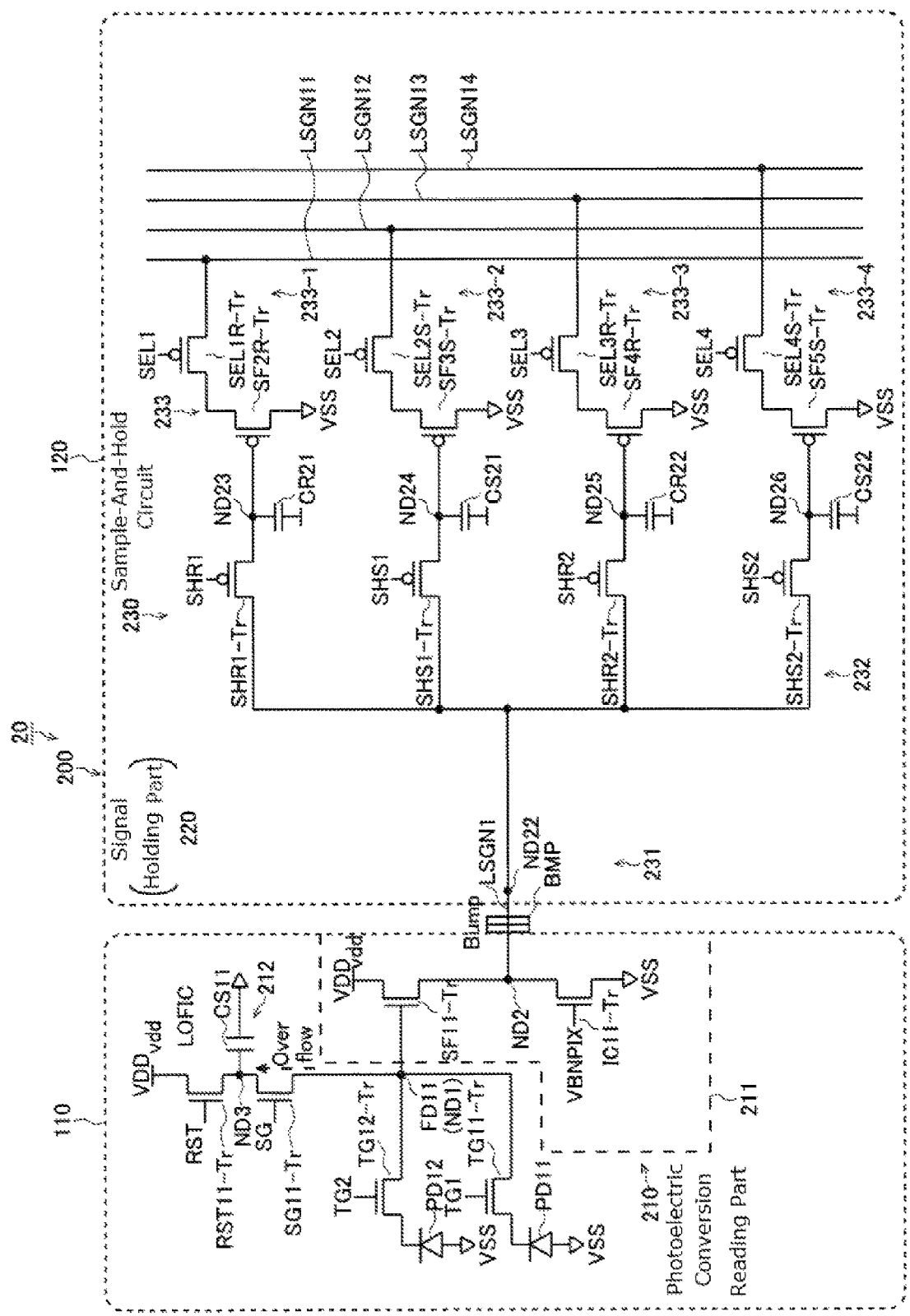
FIG. 3 is a circuit diagram showing an example configuration of the pixel of the solid-state imaging device relating to the first embodiment of the present invention.

FIG. 3 is a circuit diagram showing an example of the pixels 200 of the solid-state imaging device 10 relating to the first embodiment of the present invention.

The pixels 200 arranged in the pixel part 20 each include the photoelectric conversion reading part 210 and the signal holding part 220, as described above. The pixel part 20 relating to the first embodiment is configured as a stacked CMOS image sensor made up by a first substrate 110 and a second substrate 120, as will be described below in detail. In the present example, as shown in FIG. 3, the photoelectric conversion reading part 210 is formed in the first substrate 110, and the signal holding part 220 is formed in the second substrate 120.

The photoelectric conversion reading part 210 of the pixel 200 includes two photodiodes (photoelectric conversion elements) and one in-pixel amplifier. More specifically, the photoelectric conversion reading part 210 includes, for example, the first photodiode PD11, which is a first photoelectric conversion element, and the second photodiode PD12, which is a second photoelectric conversion element. In the pixel 200 relating to the first embodiment, the first and second photodiodes PD11 and PD12 share the floating diffusion FD11, which serves as an output node ND1.

The first and second photodiodes PD11 and PD12 perform photoelectric conversion to generate charges and store the generated charges in an integration period. The first transfer transistor TG11-Tr serving as the first transfer element is connected between the first photodiode PD11 and the floating diffusion FD11. The second transfer transistor TG12-Tr serving as the second transfer element is connected between the second photodiode PD12 and the floating diffusion FD11.

The photoelectric conversion reading part 210 includes, for one floating diffusion FD11 serving as the output node ND1, one reset transistor RST11-Tr serving as a reset element, one source follower transistor SF11-Tr serving as a source follower element, one current transistor IC11-Tr serving as a current source element, one storage transistor SG11-Tr serving as a storage connecting element, one storage capacitor CS11 serving as a storage capacitance element, and one reading node ND2.

In the first embodiment, the source follower transistor SF11-Tr, the current transistor IC11-Tr, and the reading node ND2 together constitute the conversion signal reading part 211 serving as an output buffer part. The storage transistor SG11-Tr and the storage capacitor CS11 serving as a storage capacitor element together constitute a gain switching part 212.

In the photoelectric conversion reading part 210 relating to the first embodiment, the reading node ND2 of the conversion signal reading part 211 is connected to the input part of the signal holding part 220 via the internal signal line LSGN1. The conversion signal reading part 211 is configured to convert the charges in the floating diffusion FD11 serving as the output node ND into a voltage signal at a level corresponding to the amount of charges and outputs the voltage signal VSL to the signal holding part 220.

The first and second photodiodes PD11 and PD12 generate signal charges (electrons) in an amount determined by the amount of the incident light and stores the same. Description will be hereinafter given of a case where the signal charges are electrons and each transistor is an n-type transistor. However, it is also possible that the signal charges are holes or each transistor is a p-type transistor. Further, this embodiment is also applicable to the case where a plurality of (three or more) photodiodes and transfer transistors share the transistors.

The photodiodes (PD) in each pixel 200 are pinned photodiodes (PPDs). On a substrate surface for forming the photodiodes (PDs), there is a surface level due to dangling bonds or other defects, and therefore, a lot of charges (dark current) are generated due to heat energy, so that signals fail to be read out correctly. In the case of pinned photodiodes (PPDs), the charge storage part of the photodiodes (PD) are buried in the substrate to reduce mixing of the dark current into the signals.

The first transfer transistor TG11-Tr of the photoelectric conversion reading part 210 is connected between the first photodiode PD11 and the floating diffusion FD11 and controlled by a control signal TG1 applied to the gate thereof through a control line. The first transfer transistor TG11-Tr remains selected and in the conduction state during a transfer period PT in which the control signal TG1 is at the high (H) level, to transfer to the floating diffusion FD11 the charges (electrons) produced by the photoelectric conversion and then stored in the first photodiode PD11.

The second transfer transistor TG12-Tr of the photoelectric conversion reading part 210 is connected between the second photodiode PD12 and the floating diffusion FD12 and controlled by a control signal TG2 applied to the gate thereof through a control line. The second transfer transistor TG12-Tr remains selected and in the conduction state during a transfer period PT in which the control signal TG2 is at the high (H) level, to transfer to the floating diffusion FD11 the charges (electrons) produced by the photoelectric conversion and then stored in the second photodiode PD12.

After the photodiodes PD11 and PD12 and the floating diffusion FD11 are reset to a predetermined reset potential, the transfer transistors TG11-Tr and TG12-Tr enters the non-conduction state with the control signal TG being set to the low (L) level and the photodiodes PD11 and PD12 enter an integration period PI. Under these circumstances, if the intensity of the incident light is very high (the amount of the incident light is very large), the charges above the well capacity overflow into the floating diffusion FD11 as overflow charges through the overflow path under the transfer transistors TG11-Tr and TG12-Tr. If the incident light has very high illuminance, for example, the charges above the well capacity of the floating diffusion FD11 overflow to the storage capacitor CS11 as overflow charges through the overflow path under the storage transistor SG11-Tr.

The reset transistor RST11-Tr is connected between the power supply line Vdd of the power supply voltage VDD and the floating diffusion FD11 and controlled by a control signal RST applied to the gate thereof through a control line. The reset transistor RST11-Tr remains selected and in the conduction state during a reset period in which the control signal RST is at the H level, to reset the floating diffusion FD11 to the potential of the power supply line Vdd of the power supply voltage VDD.

The storage transistor SG11-Tr is connected between the floating diffusion FD11 and the reset transistor RST11-Tr, and the storage capacitor CS11 is connected between (i) a connection node ND3 between the floating diffusion FD11 and the reset transistor RST11-Tr and (ii) the reference potential VSS. The storage transistor SG11-Tr is controlled by a control signal SG applied to the gate thereof through a control line. The storage transistor SG11-Tr remains selected and in the conduction state during a reset period in which the control signal SG is at the H level so as to connect the floating diffusion FD11 and the storage capacitor CS11.

The source follower transistor SF11-Tr serving as a source follower element is connected at the source thereof to the reading node ND2, at the drain thereof to the power supply line Vdd, and at the gate thereof to the floating diffusion FD11. The drain and source of the current transistor IC11-Tr serving as a current source element are connected between the reading node ND2 and the reference potential VSS (for example, GND). The gate of the current transistor IC11-Tr is connected to the feeding line of a control signal VBNPIX. The internal signal line LSGN1 between the reading node ND2 and the input part of the signal holding part 220 is driven by the current transistor IC11-Tr serving as the current source element.

The following now describes a simplified cross-sectional structure of the photoelectric conversion reading part relating to the first embodiment. An example configuration of the first photodiode PD11 is hereinafter described.

Specific Example Configuration of Photoelectric Conversion Reading Part (to-be-Read Pixel) 210

Figure 4:
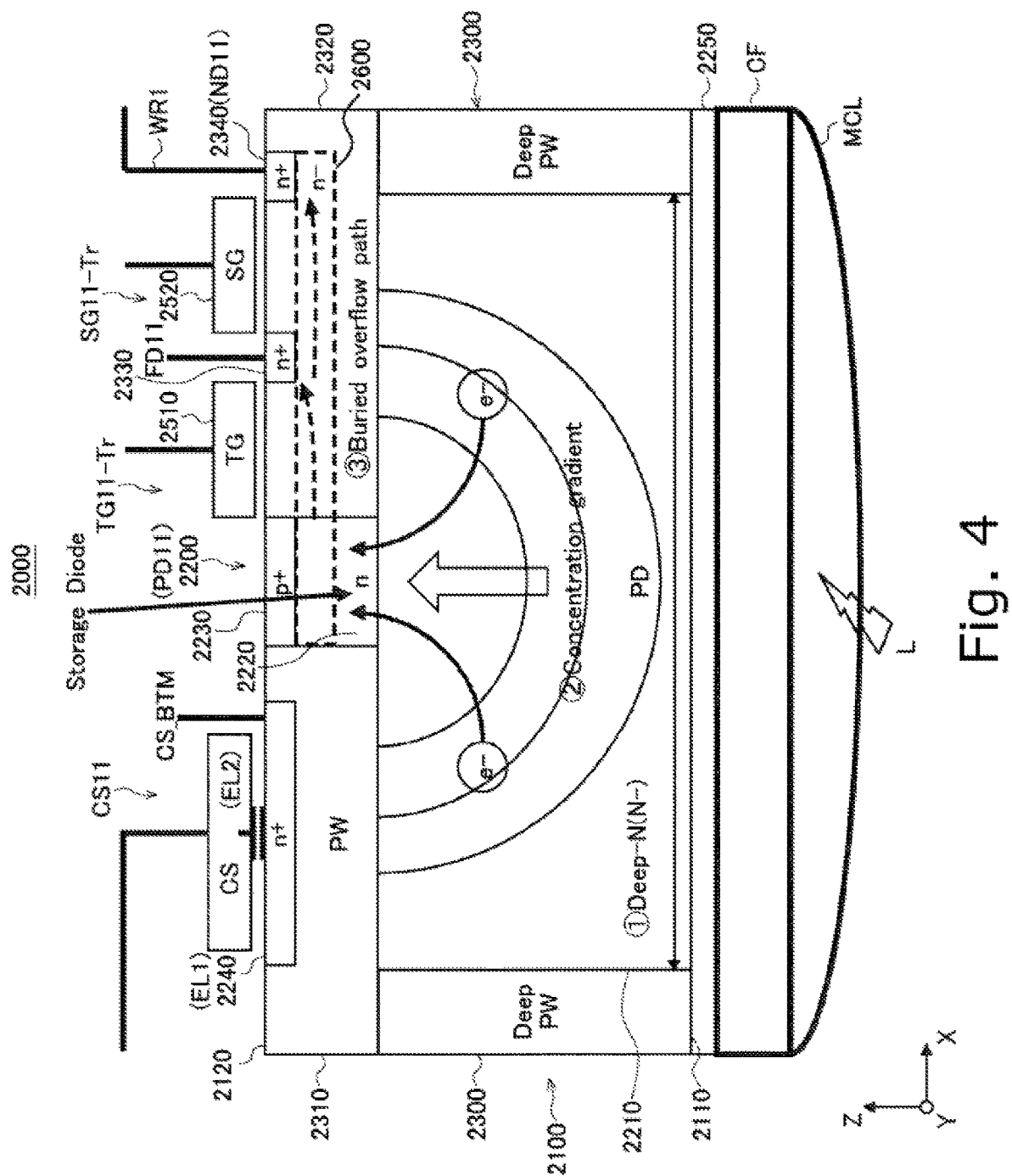
FIG. 4 is a simplified sectional view showing an example configuration of the main part of a photoelectric conversion reading part according to the first embodiment of the present invention.

FIG. 4 is a simplified sectional view showing an example configuration of the main part of the photoelectric conversion reading part according to the first embodiment of the present invention. The to-be-read pixel described herein includes a pinned photodiode (PPD) and is denoted by the reference sign 2000.

The to-be-read pixel 2000 shown in FIG. 4 includes a semiconductor substrate (hereinafter referred to simply as "the substrate") 2100 having a first substrate surface 2110 (e.g., a back surface) to be irradiated with light L and a second substrate surface 2120 (a front surface) facing away from the first substrate surface 2110. The to-be-read pixel 2000 includes: a photoelectric conversion part 2200 as the first photodiode PD11 (or the second photodiode PD12) which includes a first conductivity type (n-type in this embodiment) semiconductor layer (n layer) 2210 buried in the substrate 2100 and is configured to perform photoelectric conversion of received light and store charges; and a second conductivity type (p-type in this embodiment) semiconductor layer 2300 formed at least on a side portion of the n layer (the first conductivity type semiconductor layer) 2210 of the photoelectric conversion part 2200. The n-layer (first conductivity type semiconductor layer) 2210 of the photoelectric conversion part 2200 exhibits a gradient in concentration such that the impurity concentration of the n-type ions increases in a step-wise manner from the first substrate surface 2110 to the second substrate surface 2120.

Further, the to-be-read pixel 2000 includes: the transfer transistor TG11-Tr for transferring the charges stored in the photoelectric conversion part 2200; the floating diffusion FD11 to which the charges are transferred through the transfer transistor TG11-Tr; the storage transistor SG11-Tr having the source connected to the floating diffusion FD11; and the storage capacitor CS11 serving as a storage capacitance element for storing the charges received from the floating diffusion FD11 via the drain of the storage transistor SG11-Tr. In the to-be-read pixel 2000, the storage capacitor CS11 serving as a storage capacitance element is formed on the second substrate surface 2120 side such that it spatially overlaps the photoelectric conversion part 2200 when seen in the direction orthogonal to the substrate surface (the Z direction in the orthogonal coordinate system shown).

Further, the photoelectric conversion part 2200 includes a second conductivity type semiconductor region (a p+ region) 2230 formed on the surface of the n layer (the first conductivity type semiconductor layer) 2220 that faces the second substrate surface 2120. The second conductivity type semiconductor region (the p+ region) 2230 contains a higher concentration of impurities than the p layer (the second conductivity type semiconductor layer) 2300 on the side portion of the n layer. Further, the storage capacitor CS11 serving as a storage capacitance element uses, as a first electrode EL1 thereof, the n+ region (the first conductivity type semiconductor region) 2240 formed on the surface of the p-layer (second conductivity type semiconductor layer) 2300 on the second substrate surface 2120 side.

In the first embodiment, the storage capacitor CS11 serving as a storage capacitance element includes a first electrode EL1 and a second electrode EL2. The first electrode EL1 is formed of the n+ region (the first conductivity type semiconductor region) 2240 formed in the surface of the second substrate surface 2120 of the substrate 2100, and the second electrode EL2 is formed above the second substrate surface 2120 so as to be opposed at a distance to the first electrode EL1 in the direction orthogonal to the substrate surface.

In the first embodiment, a flat layer 2250 is formed on the surfaces of the n layer (the first conductivity type semiconductor layer) 2210 of the photoelectric conversion part 2200 and the p layer (the second conductivity type semiconductor layer) 2300 on the first substrate surface 2110 side. A color filter part CF is formed on the light incidence side of the flat layer 2250, and further, a microlens MCL is formed on the light incidence side of the color filter part so as to correspond to the photoelectric conversion part 2200 serving as the photodiode PD11 and the p layer (the second conductivity type semiconductor layer) 2300.

In the first embodiment, the p layer (the first conductivity type semiconductor layer) 2320, which constitutes, in the drawing, the right region of the second substrate surface 2120 of the substrate 2100 includes the transfer transistor TG11-Tr, the floating diffusion FD11, and the storage transistor SG11-Tr.

The floating diffusion FD11 is formed in the surface of the second substrate surface 2120 of the substrate 2100, so as to constitute an n+ region (a first conductivity type semiconductor region) 2330 containing a higher concentration of impurities than the n layers (the first conductivity type semiconductor layers) 2210, 2220 of the photoelectric conversion part 2200.

The capacitance connection node ND11 of the storage transistor SG11-Tr for capacitance connection with the storage capacitor CS11 is formed in the surface of the second substrate surface 2120 of the substrate 2100, so as to constitute an n+ region (a first conductivity type semiconductor region) 2340 containing a higher concentration of impurities than the n layers (the first conductivity type semiconductor layers) 2210, 2220 of the photoelectric conversion part 2200. The n+ region 2340 serving as the node ND11 is connected to the second electrode EL2 of the storage capacitor CS1 via a wiring layer WR1.

The transfer transistor TG11-Tr includes a gate electrode 2510 disposed above the second substrate surface 2120 of the substrate 2100 between the p+ region (the second conductivity type semiconductor region) 2230 and the n+ region (the first conductivity type semiconductor region) 2330 serving as the floating diffusion FD11.

The storage transistor SG11-Tr includes a gate electrode 2520 disposed above the second substrate surface 2120 of the substrate 2100 between the n+ region (the first conductivity type semiconductor region) 2330 serving as the floating diffusion FD11 and the n+ region (the first conductivity type semiconductor region) 2340 serving as the capacitance connection node ND11.

In the first embodiment, a buried overflow path (OVFP) 2600 is formed and connected to the upper side (the surface facing the p+ layer 2230) of the n layer 2220 of the photoelectric conversion part 2200. The buried overflow path 2600 is configured to transfer the overflow charges from the photoelectric conversion part 2200 to the floating diffusion FD11, further to the capacitance connection node ND11, which is connected to the storage capacitor CS11. The buried overflow path 2600 is formed such that (i) the channel forming underlayer under the gate electrode 2510 of the transfer transistor TG11-Tr, (ii) the underlayer under the n+ region (the first conductivity type semiconductor region) 2330 serving as the floating diffusion FD11, (iii) the channel forming underlayer under the gate electrode 2520 of the storage transistor SG11-Tr, and (iv) the underlayer under the n+ region (the first conductivity type semiconductor region) 2340 serving as the capacitance connection node ND11 are in communication with each other. The buried overflow path 2600 is formed by an n− layer having a lower impurity concentration than the n layer 2220 of the photoelectric conversion part 2200.

As described above, in the to-be-read pixel 2000 relating to the first embodiment, the buried overflow path 2600 is formed and connected to the upper side (the surface facing the p+ layer 2230) of the n layer 2220 of the photoelectric conversion part 2200. The buried overflow path 2600 is configured to transfer the overflow charges from the photoelectric conversion part 2200 to the floating diffusion FD11, further to the capacitance connection node ND11, which is connected to the storage capacitor CS11. Therefore, through the entire exposure period, the transfer transistor TG11-Tr remains off (in the non-conduction state), so that dark current is prevented at the silicon interface under the transfer transistor TG11-Tr while the charges can still overflow.

In the to-be-read pixel 2000 of the first embodiment, the storage capacitor CS11 serving as a storage capacitance element includes the first electrode EL1 and the second electrode EL2 on the second substrate surface 2120 side. The first electrode EL1 is formed of the n+ region (the first conductivity type semiconductor region) 2240 formed in the surface of the second substrate surface 2120 of the substrate 2100, and the second electrode EL2 is formed above the second substrate surface 2120 so as to be opposed at a distance to the first electrode EL1 in the direction orthogonal to the substrate surface. The first and second electrodes EL1 and EL2 spatially overlap the photoelectric conversion part 2200 when seen in the direction orthogonal to the substrate surface (the Z direction in the orthogonal coordinate system in FIG. 4). Accordingly, it can be prevented that an enlarged capacitance of the storage capacitor CS11 results in a reduced photodiode PD 11 fill factor that leads to a lower sensitivity. In addition, it can be prevented that an enlarged light receiving area of the photodiode PD11 results in reduction of the area occupied by the storage capacitor CS11 that leads to a reduced dynamic range. As described above, the first embodiment can implement both a high dynamic range and a high sensitivity.

According to the above-described features, each to-be-read pixel (photoelectric conversion reading part) 2000 has two photoelectric conversion elements, specifically, the first and second photodiodes PD11 and PD12. In the first embodiment, in order to obtain phase information for the autofocus (AF) purpose, the first and second photodiodes PD11 and PD12 are adjacent to each other and share a single microlens MCL, so that the single microlens MCL allows light to enter the respective photoelectric conversion areas of the first and second photodiodes PD11 and PD12.

Figure 5A:
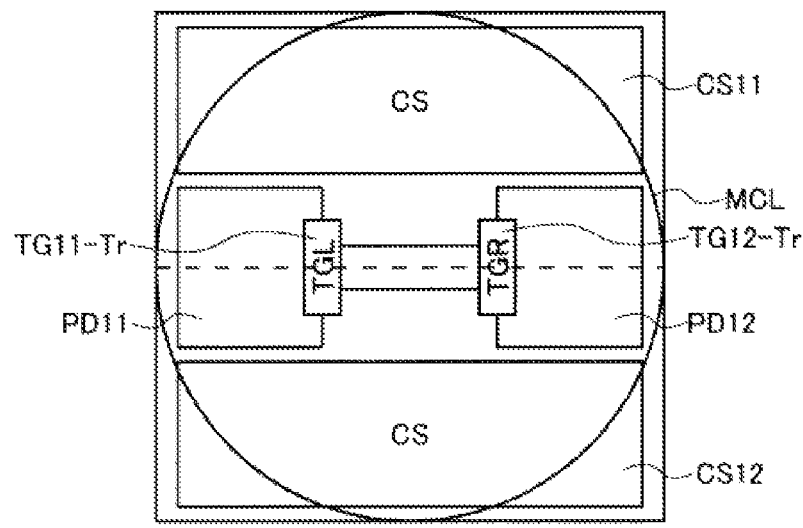
FIGS. 5A and 5B show a first example of how to arrange two photodiodes in the first embodiment of the present invention.
Figure 5B:
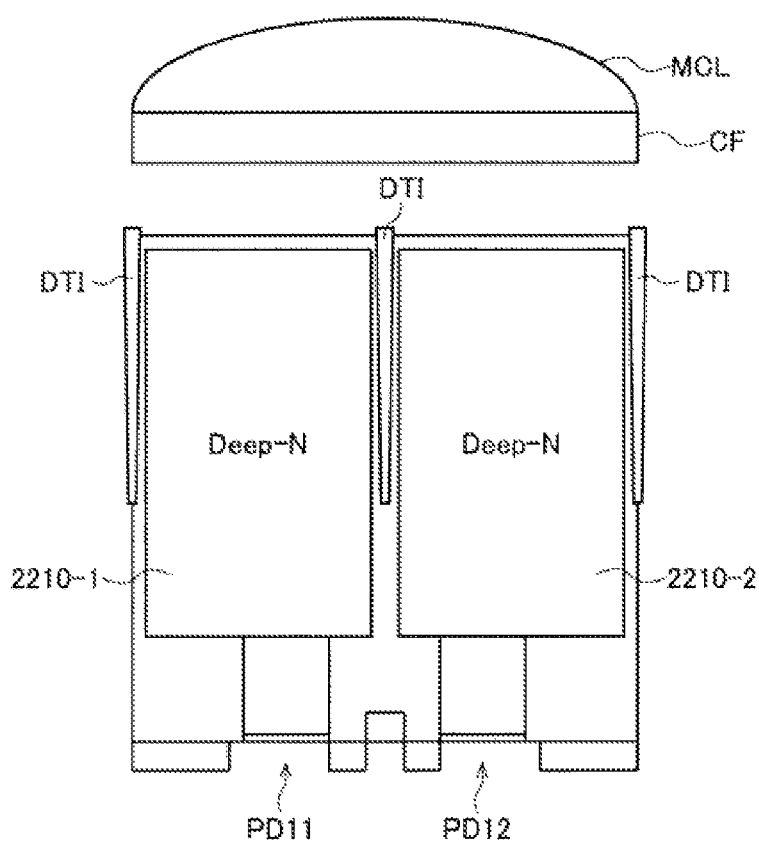
Figure 6A:
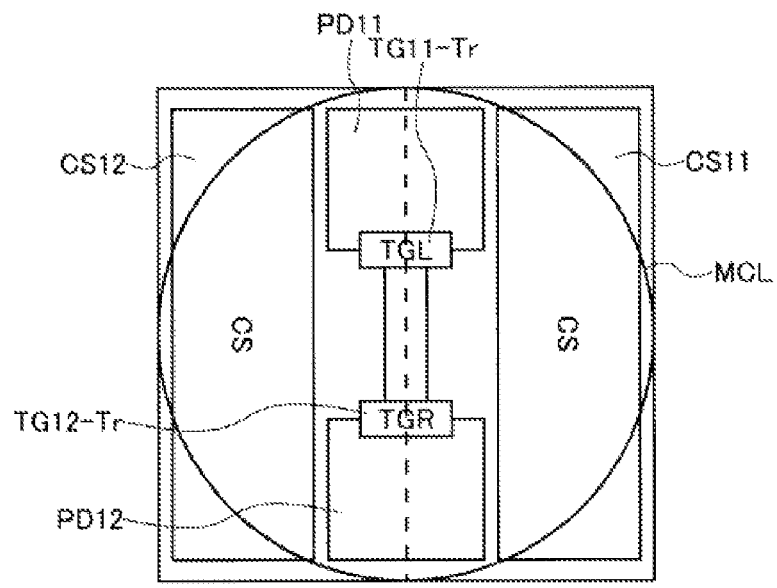
FIGS. 6A and 6B show a second example of how to arrange two photodiodes in the first embodiment of the present invention.
Figure 6B:
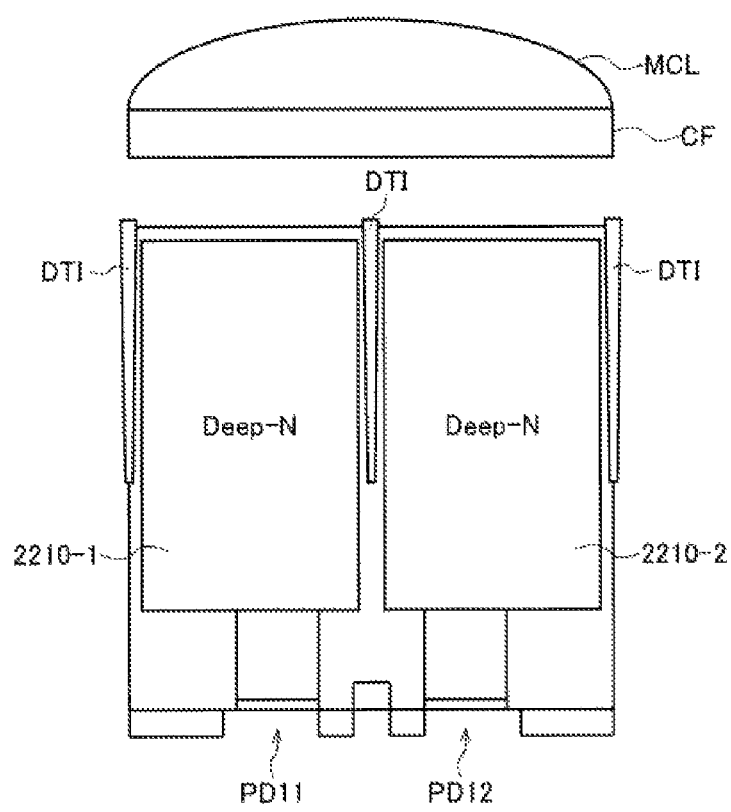

FIGS. 5A and 5B show a first example of how to arrange the two photodiodes in the first embodiment of the present invention. FIGS. 6A and 6B show a second example of how to arrange the two photodiodes in the first embodiment of the present invention. FIGS. 5A and 6A are plan views, and FIGS. 5B and 6B are simplified sectional views.

In the first embodiment of the present disclosure, as shown in FIGS. 5A to 6B, a first photoelectric conversion region 2210-1 of the first photodiode PD11 to which the first transfer transistor TG11-Tr is connected and a second photoelectric conversion region 2210-2 of the second photodiode PD12 to which the second transfer transistor TG12-Tr is connected are arranged with the floating diffusion FD11 being sandwiched therebetween, so that the first and second transfer transistors TG11-Tr and TG12-Tr face each other and are adjacent to each other in the row, column or diagonal direction of the array of pixels. The storage capacitors CS11 and CS12 serving as the storage capacitance elements are arranged in parallel with the first and second photoelectric conversion regions 2210-1 and 2210-2.

Figure 7A:
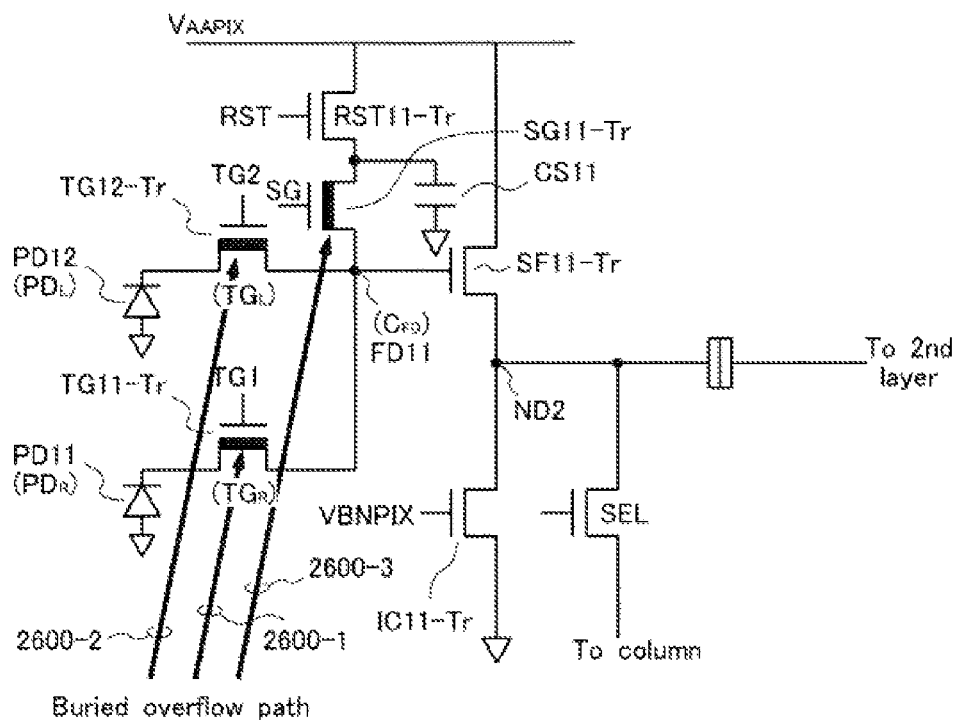
FIGS. 7A and 7B show an example of how to form the photoelectric conversion reading part relating to the first embodiment of the present invention, where buried overflow paths are respectively formed under first and second transfer transistors connected to two photodiodes.
Figure 7B:
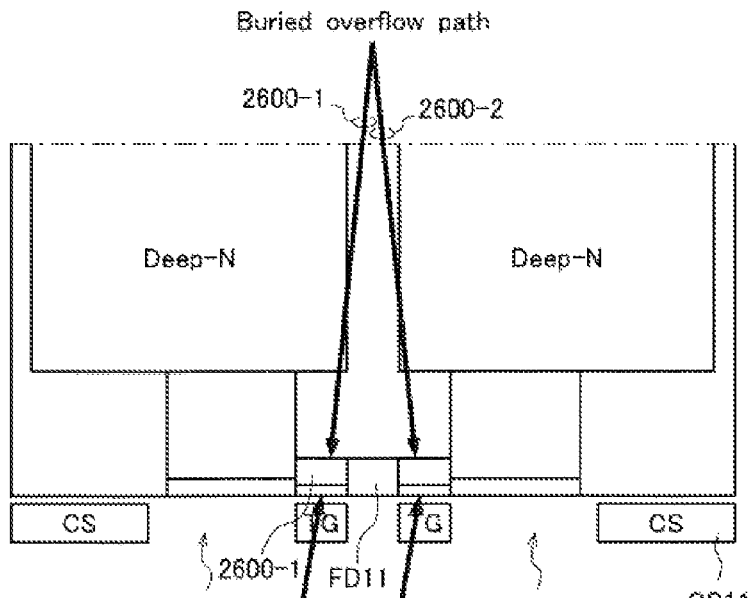

FIGS. 7A and 7B show an example of how to form the photoelectric conversion reading part 210 relating to the first embodiment, where buried overflow paths 2600-1 and 2600-2 are respectively formed under the first and second transfer transistors TG11-Tr and TG12-Tr connected to the two photodiodes PD11 and PD12. FIGS. 7A and 7B are respectively an equivalent circuit diagram and a simplified sectional view.

The photoelectric conversion reading part 210 of FIGS. 7A and 7B includes a first overflow path 2600-1 formed in a layer deeper than the channel formation region under the gate electrode 2510 of the first transfer transistor TG11-Tr. The first overflow path 2600-1 is configured to allow the charges to overflow from the first photodiode PD11 toward the region where the floating diffusion FD11 is formed. The photoelectric conversion reading part 210 further includes a second overflow path 2600-2 formed in a layer deeper than the channel formation region under the gate electrode 2510 of the second transfer transistor TG12-Tr. The second overflow path 2600-2 is configured to allow the charges to overflow from the second photodiode PD12 toward the region where the floating diffusion FD11 is formed.

In the first embodiment, the buried overflow paths 2600-1 and 2600-2 are respectively formed under the first and second transfer transistors TG11-Tr and TG12-Tr connected to the two photodiodes PD11 and PD12 of the photoelectric conversion reading part 210. As a result, in the first embodiment, the overflow charges can be reliably stored in the storage capacitor CS11 and the floating diffusion FD11 through the overflow paths 2600-1 and 2600-2 under the first and second photodiodes PD11 and PD12.

The signal holding part 220 of the pixel 200 is constituted by the sample-and-hold circuit 230, as shown in FIG. 3. The sample-and-hold circuit 230 basically includes the input part 231 including the input node ND22, the sample-and-hold part 232, the output part 233, and holding nodes ND23, ND24, ND25 and ND26.

The input part 231 is connected to the reading node ND2 of the photoelectric conversion reading part 210 via the internal signal line LSGN1 and inputs, into the sample-and-hold part 232, the read-out signal (VSIG) and the read-out reset signal (VRST) output from the reading node ND2.

The sample-and-hold part 232 includes a first sampling transistor SHR1-Tr serving as a first switch element, a second sampling transistor SHS1-Tr serving as a second switch element, a third sampling transistor SHR2-Tr serving as a third switch element, a fourth sampling transistor SHS2-Tr serving as a fourth switch element, a first signal holding capacitor CR21, a second signal holding capacitor CS21, a third signal holding capacitor CR22, and a fourth signal holding capacitor CS22.

The first sampling transistor SHR1-Tr is connected between the holding node ND23 and the input node ND22 connected to the internal signal line LSGN1. The first sampling transistor SHR1-Tr keeps the first signal holding capacitor CR21 of the sample-and-hold part 232 selectively connected to the reading node ND2 of the photoelectric conversion reading part 210 via the holding node ND23 during a global shutter period or signal holding capacitor clear period. The first sampling transistor SHR1-Tr is in the conduction state during a period in which, for example, a control signal SHR1 is at the high level. The first signal holding capacitor CR21 is connected between the holding node ND23 and the reference potential VSS.

The second sampling transistor SHS1-Tr is connected between the holding node ND24 and the input node ND22 connected to the internal signal line LSGN1. The second sampling transistor SHS1-Tr keeps the second signal holding capacitor CS21 of the sample-and-hold part 232 selectively connected to the reading node ND2 of the photoelectric conversion reading part 210 via the holding node ND24 during a global shutter period or signal holding capacitor clear period. The second sampling transistor SHS1-Tr is in the conduction state during a period in which, for example, a control signal SHS1 is at the high level. The second signal holding capacitor CS21 is connected between the holding node ND24 and the reference potential VSS.

The third sampling transistor SHR2 Tr is connected between the holding node ND25 and the input node ND22 connected to the internal signal line LSGN1. The third sampling transistor SHR2-Tr keeps the third signal holding capacitor CR22 of the sample-and-hold part 232 selectively connected to the reading node ND2 of the photoelectric conversion reading part 210 via the holding node ND25 during a global shutter period or signal holding capacitor clear period. The third sampling transistor SHR2-Tr is in the conduction state during a period in which, for example, a control signal SHR2 is at the high level. The third signal holding capacitor CR22 is connected between the holding node ND25 and the reference potential VSS.

The fourth sampling transistor SHS2 Tr is connected between the holding node ND26 and the input node ND22 connected to the internal signal line LSGN1. The fourth sampling transistor SHS2-Tr keeps the fourth signal holding capacitor CS22 of the sample-and-hold part 232 selectively connected to the reading node ND2 of the photoelectric conversion reading part 210 via the holding node ND26 during a global shutter period or signal holding capacitor clear period. The fourth sampling transistor SHS2-Tr is in the conduction state during a period in which, for example, a control signal SHS2 is at the high level. The fourth signal holding capacitor CS22 is connected between the holding node ND26 and the reference potential VSS.

The first sampling transistor SHR1-Tr, the second sampling transistor SHS1-Tr, the third sampling transistor SHR2-Tr, and the fourth sampling transistor SHS2 Tr are formed by a MOS transistor, for example, a p-channel MOS (PMOS) transistor.

The output part 233 includes a first output part 233-1, a second output part 233-2, a third output part 233-3, and a fourth output part 233-4.

The first output part 233-1 includes a source follower transistor SF2R-Tr serving as a second source follower element for basically outputting the signal held in the first signal holding capacitor CR21 as a signal at a level determined by the held voltage in a global shutter period, and selectively outputs the held signal to the vertical signal line LSGN11 through a selection transistor SEL1R-Tr.

The source follower transistor SF2R-Tr and the selection transistor SEL1R-Tr are connected in series between the reference potential VSS and the vertical signal line LSGN11.

The gate of the source follower transistor SF2R-Tr is connected to the holding node ND23, and the selection transistor SEL1R-Tr is controlled by a control signal SEL1 applied to the gate thereof through a control line. The selection transistor SEL1R-Tr remains selected and in the conduction state during a selection period in which the control signal SEL1 is at the H level. In this way, the source follower transistor SF2R-Tr outputs, to the vertical signal line LSGN11, read-out voltage (VRST) of a column output corresponding to the voltage held in the first signal holding capacitor CR21.

The second output part 233-2 includes a source follower transistor SF3S-Tr serving as a third source follower element for basically outputting the signal held in the second signal holding capacitor CS21 as a signal at a level determined by the held voltage in a global shutter period, and selectively outputs the held signal through the selection transistor SEL2S-Tr, to the vertical signal line LSGN12.

The source follower transistor SF3S-Tr and the selection transistor SEL2S-Tr are connected in series between the reference potential VSS and the vertical signal line LSGN12.

The gate of the source follower transistor SF3S-Tr is connected to the holding node ND24, and the selection transistor SEL2S-Tr is controlled by a control signal SEL2 applied to the gate thereof through a control line. The selection transistor SEL2S-Tr remains selected and in the conduction state during a selection period in which the control signal SEL2 is at the H level. In this way, the source follower transistor SF3S-Tr outputs, to the vertical signal line LSGN12, read-out voltage (VSIG) of a column output corresponding to the voltage held in the second signal holding capacitor CS21.

The third output part 233-3 includes a source follower transistor SF4R-Tr serving as a fourth source follower element for basically outputting the signal held in the third signal holding capacitor CR22 as a signal at a level determined by the held voltage in a global shutter period, and selectively outputs the held signal to the vertical signal line LSGN13 through a selection transistor SEL3R-Tr.

The source follower transistor SF4R-Tr and the selection transistor SEL3R-Tr are connected in series between the reference potential VSS and the vertical signal line LSGN13.

The gate of the source follower transistor SF4R-Tr is connected to the holding node ND25, and the selection transistor SEL3R-Tr is controlled by a control signal SEL3 applied to the gate thereof through a control line. The selection transistor SEL3R-Tr remains selected and in the conduction state during a selection period in which the control signal SEL3 is at the H level. In this way, the source follower transistor SF4R-Tr outputs, to the vertical signal line LSGN13, read-out voltage (VRST) of a column output corresponding to the voltage held in the third signal holding capacitor CR22.

The fourth output part 233-4 includes a source follower transistor SF5S-Tr serving as a fifth source follower element for basically outputting the signal held in the fourth signal holding capacitor CS22 as a signal at a level determined by the held voltage in a global shutter period, and selectively outputs the retained signal through the selection transistor SEL4S-Tr, to the vertical signal line LSGN14.

The source follower transistor SF5S-Tr and the selection transistor SEL4S-Tr are connected in series between the reference potential VSS and the vertical signal line LSGN14.

The gate of the source follower transistor SF5S-Tr is connected to the holding node ND26, and the selection transistor SEL4S-Tr is controlled by a control signal SEL4 applied to the gate thereof through a control line. The selection transistor SEL4S-Tr remains selected and in the conduction state during a selection period in which the control signal SEL4 is at the H level. In this way, the source follower transistor SF5S-Tr outputs, to the vertical signal line LSGN14, read-out voltage (VSIG) of a column output corresponding to the voltage held in the fourth signal holding capacitor CS22.

As described above, in the solid-state imaging device 10 relating to the first embodiment, in the voltage mode, the pixel signal is sampled into the signal holding part 220 serving as a pixel signal storage, which takes place in all of the pixels at the same time, and the signals obtained by converting the read-out signals retained in the first, second, third and fourth signal holding capacitors CR21, CS21, CR22 and CS22 are read out to the vertical signal lines LSGN11 to 14 and fed to the column reading circuit 40.

In the pixel part 20, the reset transistor RST11-Tr and the transfer transistors TG11-Tr and TG12-Tr are used to reset the photodiodes concurrently in all of the pixels, so that exposure to light starts concurrently and in parallel in all of the pixels. After the exposure of a predetermined duration ends, the transfer transistor TG11-Tr (TG12-Tr) is used to allow the signal holding part 220 to sample the output signal from the photoelectric conversion reading part 210, so that the exposure ends concurrently in parallel in all of the pixels. This successfully accomplish a perfect electronic shutter.

The vertical scanning circuit 30 drives the photoelectric conversion reading parts 210 and the signal holding parts 220 of the pixels 200 through row-scanning control lines in shutter and reading rows, under the control of the timing control circuit 60. Further, the vertical scanning circuit 30 outputs, according to an address signal, row selection signals indicating the row addresses of the reading row from which signals are to be read out and the shutter row in which the charges stored in the photodiodes PD are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel. The column reading circuit 40 amplifies and AD converts, in the global shutter mode, the differential pixel signals Pixout (VSL) that are read out from the signal holding parts 220 of the pixels 200 to the vertical signal lines LSGN11 to 14.

The pixel signal Pixout (VSL) denotes a pixel read-out signal including a read-out signal VSIG and a read-out reset signal VRST that are read in the stated order from the pixel (in the present example, the photoelectric conversion reading part 210 and the signal holding part 220 of the pixel 200) in the global shutter mode.

In the solid-state imaging device 10 relating to the first embodiment, the column reading circuit 40 is configured such that the single circuit configuration can be used in any operational modes and for read-out signals of any signal types (single-ended or differential read-out signals).

The column reading circuit 40 includes an amplifier (AMP) and an analog-to-digital converter (ADC), for example.

The horizontal scanning circuit 50 scans the signals processed in the plurality of column signal processing circuits, for example, ADCs of the column reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

The reading part 70 is capable of reading the pixel signal VSL in the autofocus mode MDAF, image capturing mode MDIC, and dual conversion gain readout mode MDDCG. In the autofocus mode MDAF, the reading part 70 performs reading control such that the first and second transfer transistors TG11-Tr and TG12-Tr remain in the conduction state in different transfer periods and that a read-out operation on a pixel signal corresponding to the charges stored in the first photodiode PD11 and a read-out operation on a pixel signal corresponding to the charges stored in the second photodiode PD12 are separately performed with the first conversion gain HCG or the second conversion gain LCG.

In the image capturing mode MDIC and the dual conversion gain readout mode MDDCG, the reading part 70 performs reading control such that the first and second transfer transistors TG11-Tr and TG12-Tr remain in the conduction state in the same transfer period and a read-out operation on a pixel signal corresponding to the sum of the charges stored in the first photodiode PD11 and the charges stored in the second photodiode PD12 is performed with the first conversion gain HCG and subsequently with the second conversion gain LCG.

In the image capturing mode MDIC, the reading part 70 resets the floating diffusion FD11, the storage capacitance element (storage capacitor), the first photodiode PD11 and the second photodiode PD12 and keeps the first and second transfer transistors TG11-Tr and TG12-Tr in the non-conduction state, so that an exposure period starts. After this, the reading part 70 sequentially performs a first conversion gain reset read-out operation, a first conversion gain signal read-out operation, a second conversion gain reset read-out operation, and a second conversion gain signal read-out operation.

In the dual conversion gain read-out mode MDDCG, the reading part 70 resets the floating diffusion FD11, the storage capacitance element (storage capacitor), the first photodiode PD11 and the second photodiode PD12 and keeps the first and second transfer transistors TG11-Tr and TG12-Tr in the non-conduction state, so that an exposure period starts. After this, the reading part 70 sequentially performs a second conversion gain reset read-out operation, a first conversion gain reset read-out operation, a first conversion gain signal read-out operation, and a second conversion gain signal read-out operation.

<Stacked Structure of Solid-State Imaging Device 10>

The following describes the stacked structure of the solid-state imaging device 10 relating to the first embodiment.

The solid-state imaging device 10 relating to the first embodiment has a stacked structure of a first substrate (an upper substrate) 110 and a second substrate (a lower substrate) 120. The solid-state imaging device 10 is formed as an imaging device having a stacked structure that is obtained, for example, by bonding wafers together and subjecting the bonded wafers to dicing. In the present example, the first substrate 110 is stacked on the second substrate 120.

A pixel array is centered around the central portion of the first substrate 110. In the pixel array, the photoelectric conversion reading parts 210 of the pixels 200 of the pixel part 20 are arranged. As described above, basically in the first embodiment, the photoelectric conversion reading parts 210 of the pixels 200 are arranged in a matrix pattern in the first substrate 110.

In the second substrate 120, a holding part array is formed and centered around the central portion of the second substrate 120, and the vertical signal lines LSGN11 to 14 are also formed. In the holding part array, the signal holding parts 220 of the pixels 200, which are connected to the output nodes ND2 of the photoelectric conversion reading parts 210 of the pixel array, are arranged in a matrix pattern. The holding part array may be completely blocked from light by a metal wiring layer. On the lateral side of the holding part array, a region for the vertical scanning circuit 30 and a region for the digital and output systems may be formed. In the second substrate 120, the vertical scanning circuit 30, the horizontal scanning circuit 50 and the timing control circuit 60 may be also formed.

In the stacked structure, the reading nodes ND2 of the photoelectric conversion reading parts 210 of the pixel array in the first substrate 110 are electrically connected to the input nodes ND22 of the signal holding parts 220 of the pixels 200 in the second substrate 120 through via microbumps BMP (die-to-die vias) or the like as shown in FIGS. 2 and 3, for example.

<Read-Out Operation in Solid-State Imaging Device 10>

The above has described the characteristic configurations and functions of the parts of the solid-state imaging device 10. The following outlines how to read the pixel signal in the solid-state imaging device 10 relating to the first embodiment in the auto-focus mode MDAF, image capturing mode MDIC, and dual conversion gain read-out mode MDDCG.

Figure 8:
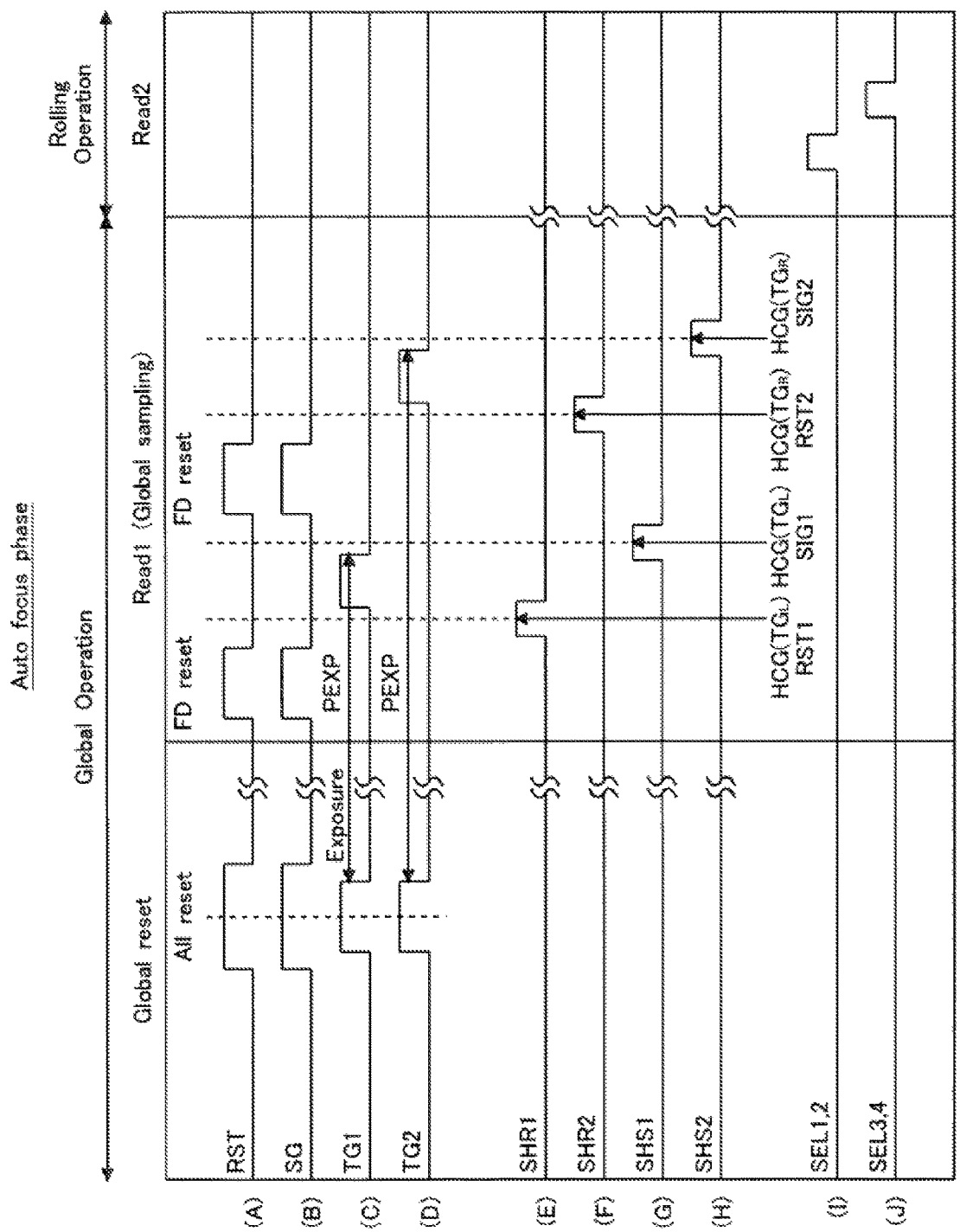
FIG. 8 is a timing chart to illustrate an example sequence of operations for read-out performed in an autofocus mode on a pixel in the solid-state imaging device relating to the first embodiment of the present invention.
Figure 9:
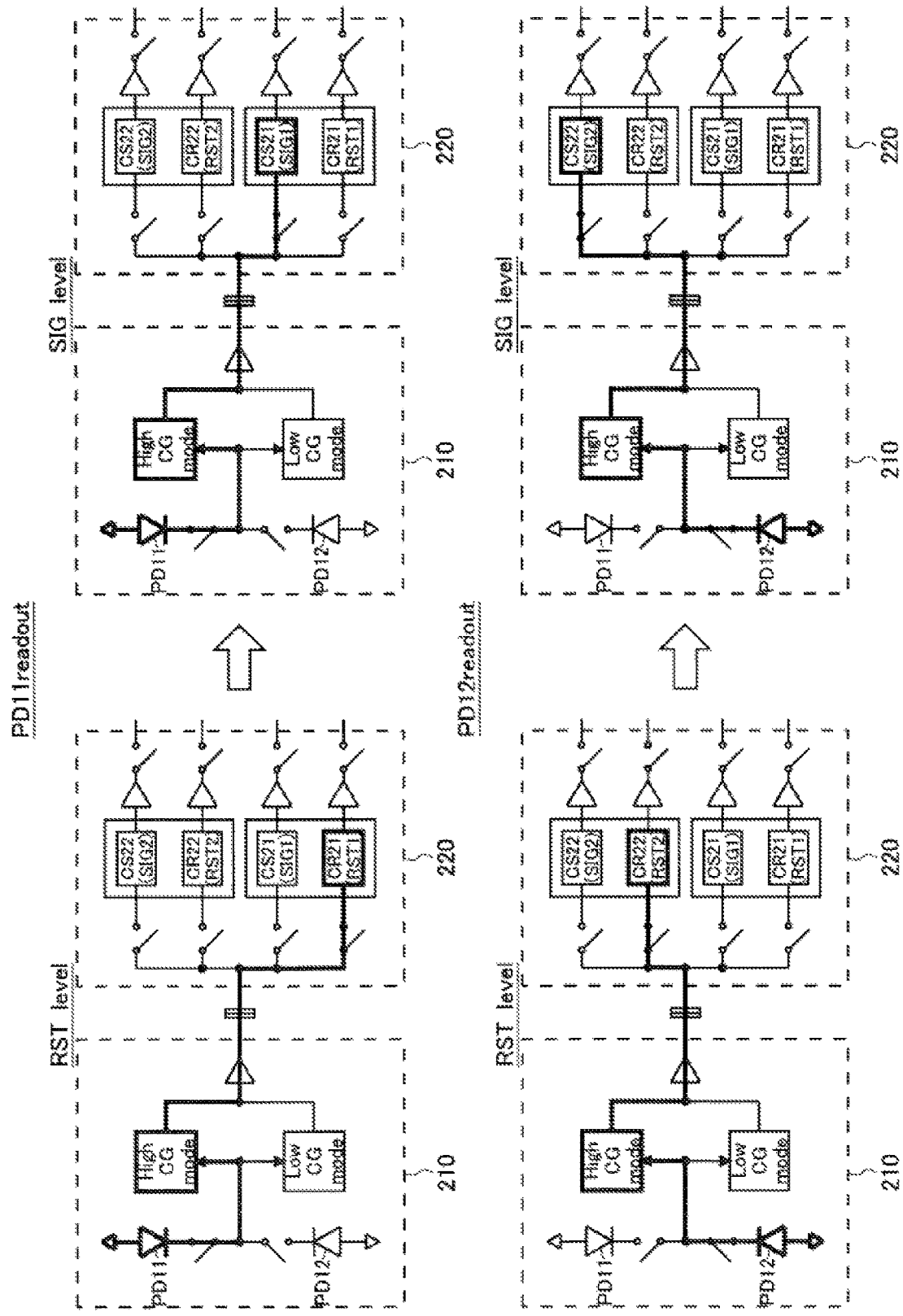
FIG. 9 shows, as an example, a read-out operation with a first conversion gain (HCG) or a read-out operation with a second conversion gain (LCG) performed in the autofocus mode on the pixel in the first embodiment of the present invention.
Figure 10:
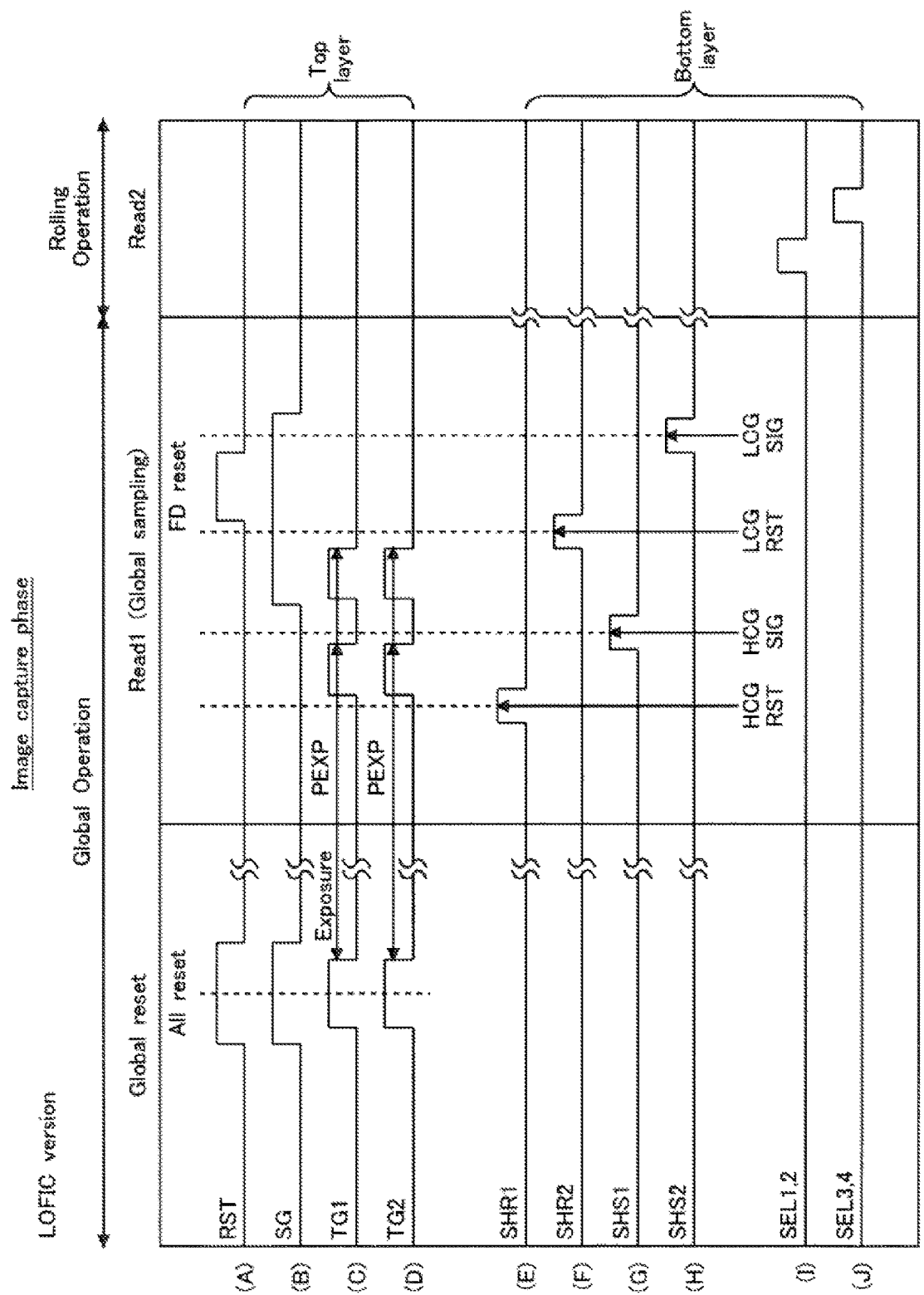
FIG. 10 is a timing chart to illustrate an example sequence of operations for read-out performed in an image capturing mode on the pixel in the solid-state imaging device relating to the first embodiment of the present invention.
Figure 11:
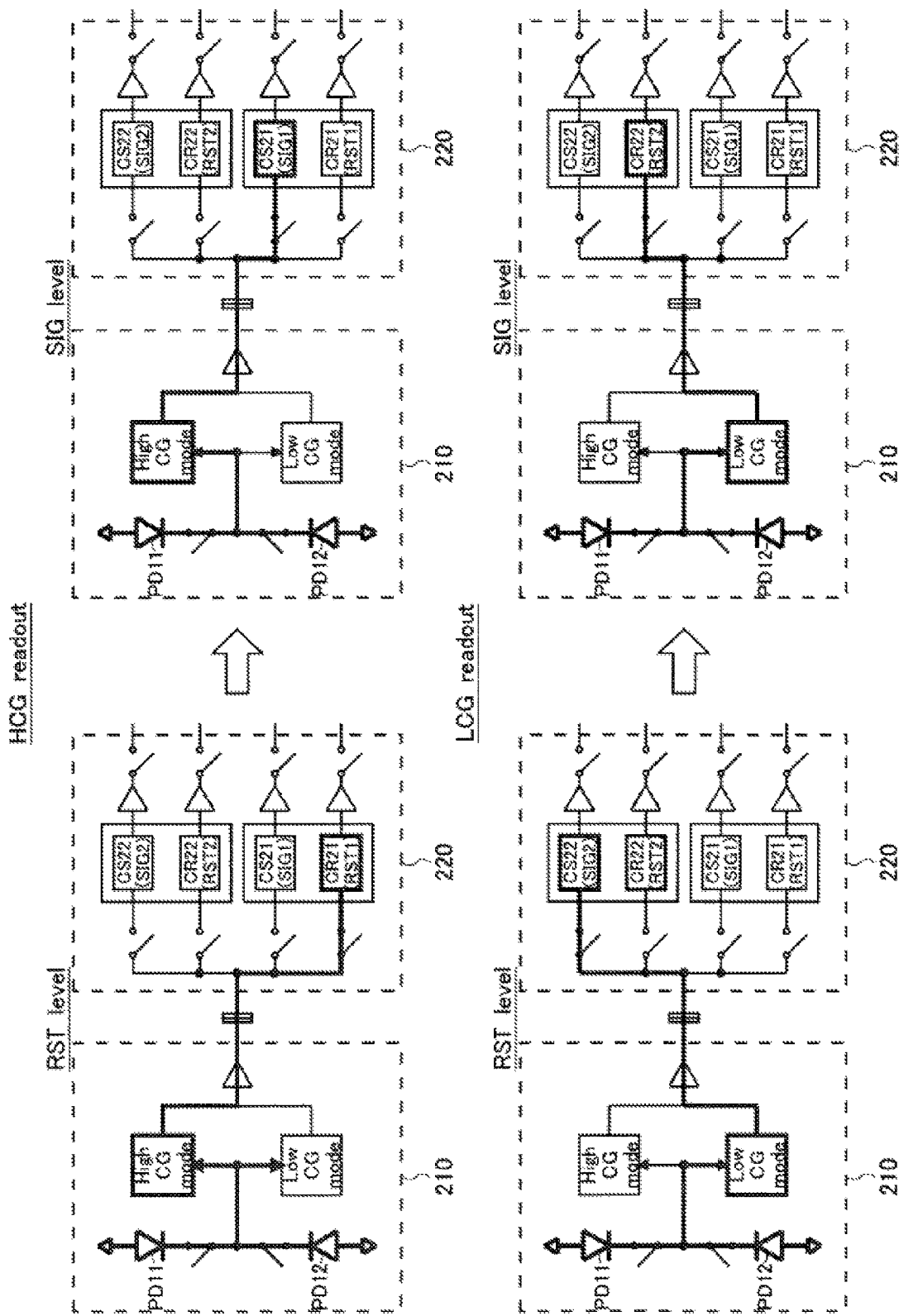
FIG. 11 shows, as an example, a read-out operation with a first conversion gain (HCG) and a read-out operation with a second conversion gain (LCG) performed in the image capturing mode on the pixel in the first embodiment of the present invention.
Figure 12:
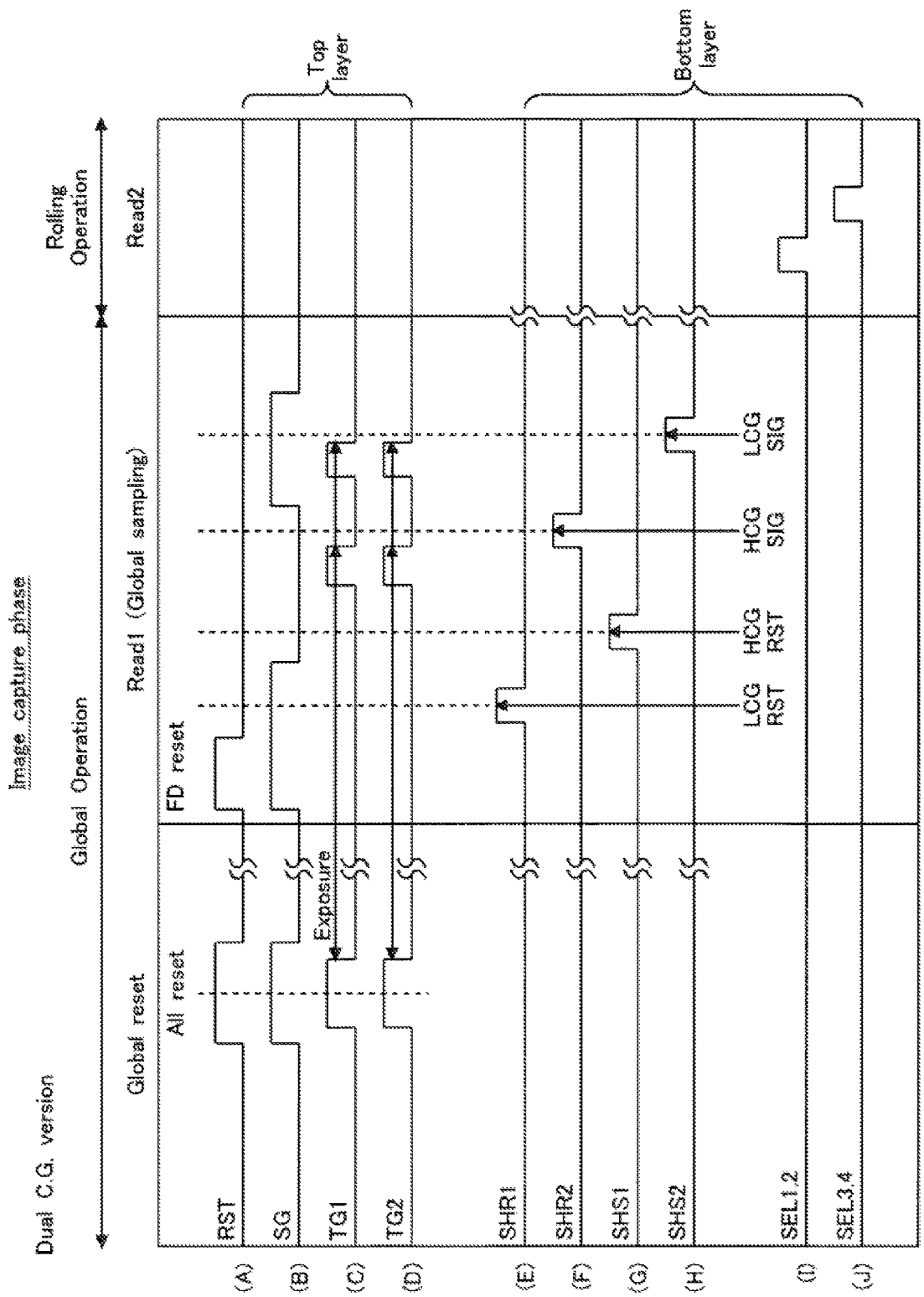
FIG. 12 is a timing chart to illustrate, as an example, a sequence of operations for read out performed in a dual-conversion-gain read-out mode MDDCG on the pixel in the solid-state imaging device relating to the first embodiment of the present invention.

FIG. 8 is a timing chart including parts (A) to (J) to illustrate an example sequence of operations for read-out performed in the autofocus mode on the pixels in the solid-state imaging device relating to the first embodiment of the present invention. FIG. 9 shows, as an example, a read-out operation with the first conversion gain (HCG) and a read-out operation with the second conversion gain (LCG) in the autofocus mode performed on the pixels in the first embodiment of the present invention. FIG. 10 is a timing chart including parts (A) to (J) to illustrate an example sequence of operations for read-out performed in the image capturing mode on the pixels in the solid-state imaging device relating to the first embodiment of the present invention. FIG. 11 shows, as an example, a read-out operation with the first conversion gain (HCG) and a read-out operation with the second conversion gain (LCG) in the image capturing mode performed on the pixels in the first embodiment of the present invention. FIG. 12 is a timing chart including views (A) to (J) to illustrate an example sequence of operations for read-out performed in the dual conversion gain read-out mode MDDCG on the pixels in the solid-state imaging device relating to the first embodiment of the present invention.

In FIGS. 8, 10 and 12, the part (A) shows the control signal RST for the reset transistor RST11-Tr, the part (B) shows the control signal SG for the storage transistor SG11-Tr, the part (C) shows the control signal TG1 for the first transfer transistor TG11-Tr of the to-be-read pixel 12, and the part (D) shows the control signal TG2 for the second transfer transistor TG12-Tr. In FIGS. 8, 10 and 12, the part (E) shows the control signal SHR1 for the first sampling transistor SHR1-Tr, the part (F) shows the control signal SHS1 for the second sampling transistor SHS1-Tr, the part (G) shows the control signal SHR2 for the third sampling transistor SHR2-Tr, and the part (H) shows the control signal SHS2 for the fourth sampling transistor SHS2-Tr. In FIGS. 8, 10 and 12, the part (I) shows the control signals SEL1 and SEL2 for the selection transistors SEL1R-Tr and SEL2S-Tr, and the part (J) shows the control signals SEL3 and SEL4 for the selection transistors SEL3R-Tr and SEL4S-Tr.

(Read-Out Operation in Autofocus Mode)

In the autofocus mode MDAF, the reading part 70 controls the reset transistor RST11-Tr, the storage transistor SG11-Tr, the first transfer transistor TG11-Tr, and the second transfer transistor TG12-Tr to remain in the conduction state for a predetermined period of time, so that the floating diffusion FD11, the storage capacitor CS11, the first photodiode PD11 and the second photodiode PD12 are reset, and then switches the first and second transfer transistors TG11-Tr and TG12-Tr to the non-conduction state, so that the exposure period PEXP starts. After the exposure period PEXP starts, the reading part 70 keeps the reset transistor RST11-Tr and the storage transistor SG11-Tr in the conduction state for a predetermined period of time, so that the floating diffusion FD11 is reset. Next, the reset transistor RST11-Tr is switched to the non-conduction state, and the storage transistor SG11-Tr is switched to the non-conduction state, so that the gain of the floating diffusion FD11 is set to the first conversion gain HCG corresponding to the first capacitance.

The reading part 70 then performs a read-out operation on the pixel signal corresponding to the charges stored in the first photodiode PD11. To begin with, the conversion signal reading part 211 reads a first read-out reset signal HCGRST1 in a first reset read-out period, and the first read-out reset signal HCGRST1 is input into the signal holding part 220 through the internal signal line LSGN1, sampled by the first sampling transistor SHR1-Tr, and held in the first signal holding capacitor CR21. The signal held in the first signal holding capacitor CR21 is subject to a first reset read-out operation, according to which the first read-out reset signal is processed in a predetermined manner.

The first reset read-out period is followed by a first transfer period, which is followed by a first read-out period. In the first read-out period, the conversion signal reading part 211 reads a first read-out luminance signal HCGSIG1, and the first read-out luminance signal HCGSIG1 is input into the signal holding part 220 through the internal signal line LSGN1, sampled by the second sampling transistor SHS1-Tr, and held in the second signal holding capacitor CS21. The signal held in the second signal holding capacitor CS21 is subject to a first luminance signal read-out operation, according to which the first read-out luminance signal is processed in a predetermined manner.

After this, the reading part 70 keeps the reset transistor RST11-Tr and the storage transistor SG11-Tr in the conduction state for a predetermined period of time, so that the floating diffusion FD11 is reset. Next, the reset transistor RST11-Tr is switched to the non-conduction state, and the storage transistor SG11-Tr is switched to the non-conduction state, so that the gain of the floating diffusion FD11 is set to the first conversion gain HCG corresponding to the first capacitance.

The reading part 70 then performs a read-out operation on the pixel signal corresponding to the charges stored in the second photodiode PD12. The conversion signal reading part 211 reads a second read-out reset signal HCGRST2 in a second reset read-out period, and the second read-out reset signal HCGRST2 is input into the signal holding part 220 through the internal signal line LSGN1, sampled by the third sampling transistor SHR2-Tr, and held in the third signal holding capacitor CR22. The signal held in the third signal holding capacitor CR22 is subject to a second reset read-out operation, according to which the second read-out reset signal is processed in a predetermined manner.

The second reset read-out period is followed by a second transfer period, which is followed by a second read-out period. In the second read-out period, the conversion signal reading part 211 reads a second read-out luminance signal HCGSIG2, and the second read-out luminance signal HCGSIG2 is input into the signal holding part 220 through the internal signal line LSGN1, sampled by the fourth sampling transistor SHS2-Tr, and held in the fourth signal holding capacitor CS22. The signal held in the fourth signal holding capacitor CS22 is subject to a second luminance signal read-out operation, according to which the second read-out luminance signal is processed in a predetermined manner.

(Read-Out Operation in Image Capturing Mode)

The following describes the read-out operation in the image capturing mode MDIC. In the image capturing mode MDIC, the reading part 70 controls the reset transistor RST11-Tr, the storage transistor SG11-Tr, the first transfer transistor TG11-Tr, and the second transfer transistor TG12-Tr to remain in the conduction state for a predetermined period of time, so that the floating diffusion FD11, the storage capacitor CS11, the first photodiode PD11 and the second photodiode PD12 are reset, and then switches the first and second transfer transistors TG11-Tr and TG12-Tr to the non-conduction state, so that the exposure period PEXP starts. After the exposure period PEXP starts, the reading part 70 keeps the reset transistor RST11-Tr and the storage transistor SG11-Tr in the conduction state for a predetermined period of time, so that the floating diffusion FD11 is reset. Next, the reset transistor RST11-Tr is switched to the non-conduction state, and the storage transistor SG11-Tr is switched to the non-conduction state, so that the gain of the floating diffusion FD11 is set to the first conversion gain HCG corresponding to the first capacitance.

In the image capturing mode MDIC, the reading part 70 performs a read-out operation, with the first and second conversion gains HCG and LCG, on the pixel signal corresponding to the sum of the charges stored in the first and second photodiodes PD11 and PD12.

To begin with, the conversion signal reading part 211 reads a first read-out reset signal HCGRST in a first reset read-out period, and the first read-out reset signal HCGRST is input into the signal holding part 220 through the internal signal line LSGN1, sampled by the first sampling transistor SHR1-Tr, and held in the first signal holding capacitor CR21. The signal held in the first signal holding capacitor CR21 is subject to a first reset read-out operation, according to which the first read-out reset signal is processed in a predetermined manner.

The first reset read-out period is followed by a first transfer period, in which the conversion signal reading part 211 keeps the control signals TG1 and TG2 at the high level to keep the first and second transfer transistors TG11-Tr and TG12-Tr in the conduction state, so that the charges stored in the first and second photodiodes PD11 and PD12 are transferred to the floating diffusion FD11. After the first transfer period, the control signals TG1 and TG2 are switched to the low level to switch the first and second transfer transistors TG11-Tr and TG12-Tr into the non-conduction state. The first reset read-out period is followed by the first transfer period, which is followed by a first read-out period. In the first read-out period, the conversion signal reading part 211 reads a first read-out luminance signal HCGSIG, and the first read-out luminance signal HCGSIG is input into the signal holding part 220 through the internal signal line LSGN1, sampled by the second sampling transistor SHS1-Tr, and held in the second signal holding capacitor CS21. The signal held in the second signal holding capacitor CS21 is subject to a first luminance signal read-out operation, according to which the first read-out luminance signal is processed in a predetermined manner.

After this, the reading part 70 switches the storage transistor SG11-Tr into the conduction state, so that the storage capacitor CS11 is connected to the floating diffusion FD11. In this way, the charges in the floating diffusion FD11 and the charges in the storage capacitor CS11 are combined, so that the gain of the floating diffusion FD11 is switched to the second conversion gain LCG corresponding to the second capacitance.

The first read-out period is followed by a second transfer period, in which the conversion signal reading part 211 keeps the control signals TG1 and TG2 at the high level to keep the first and second transfer transistors TG11-Tr and TG12-Tr in the conduction state, so that the charges stored in the first and second photodiodes PD11 and PD12 are transferred to the floating diffusion FD11. After the second transfer period, the control signals TG1 and TG2 are switched to the low level to switch the first and second transfer transistors TG11-Tr and TG12-Tr into the non-conduction state. The second transfer period is followed by a second read-out period. In the second read-out period, the conversion signal reading part 211 reads a second read-out luminance signal LCGSIG, and the second read-out luminance signal LCGSIG is input into the signal holding part 220 through the internal signal line LSGN1, sampled by the fourth sampling transistor SHS2-Tr, and held in the fourth signal holding capacitor CS22. The signal held in the fourth signal holding capacitor CS22 is subject to a second luminance signal read-out operation, according to which the second read-out luminance signal is processed in a predetermined manner.

After the second read-out period, the reading part 70 keeps the reset transistor RST11-Tr in the conduction state for a predetermined period of time, so that the floating diffusion FD11 is reset. After this, the reset transistor RST11-Tr is brought into the non-conduction state. The conversion signal reading part 211 reads a second read-out reset signal LCGRST in a second read-out period, and the second read-out reset signal LCGRST is input into the signal holding part 220 through the internal signal line LSGN1, sampled by the fourth sampling transistor SHR2-Tr, and held in the third signal holding capacitor CR22. The signal held in the third signal holding capacitor CR22 is subject to a second reset signal read-out operation, according to which the second read-out reset signal is processed in a predetermined manner.

<Read-Out Operation in Dual Conversion Gain Read-Out Mode>

The following describes the read-out operation in the dual conversion gain read-out mode MDDCG. In the dual conversion gain read-out mode MDDCG, the reading part 70 controls the reset transistor RST11-Tr, the storage transistor SG11-Tr, the first transfer transistor TG11-Tr, and the second transfer transistor TG12-Tr to remain in the conduction state for a predetermined period of time, so that the floating diffusion FD11, the storage capacitor CS11, the first photodiode PD11 and the second photodiode PD12 are reset, and then controls the first and second transfer transistors TG11-Tr and TG12-Tr to remain in the non-conduction state, so that the exposure period PEXP starts. After the exposure period PEXP starts, the reading part 70 keeps the reset transistor RST11-Tr and the storage transistor SG11-Tr in the conduction state for a predetermined period of time, so that the floating diffusion FD11 is reset. Next, the reset transistor RST11-Tr is switched to the non-conduction state, and the storage transistor SG11-Tr remains in the conduction state, so that the gain of the floating diffusion FD11 is set to the second conversion gain LCG corresponding to the second capacitance.

In the dual conversion gain read-out mode MDDCG, the reading part 70 performs a read-out operation, with the first and second conversion gains HCG and LCG, on the pixel signal corresponding to the sum of the charges stored in the first and second photodiodes PD11 and PD12.

To begin with, the conversion signal reading part 211 reads a second read-out reset signal LCGRST in a first reset read-out period, and the second read-out reset signal LCGRST is input into the signal holding part 220 through the internal signal line LSGN1, sampled by the first sampling transistor SHR1-Tr, and held in the first signal holding capacitor CR21. The signal held in the first signal holding capacitor CR21 is subject to a second reset read-out operation, according to which the second read-out reset signal is processed in a predetermined manner.

Next, the storage transistor SG11-Tr is switched to the non-conduction state, so that the gain of the floating diffusion FD11 is set to the first conversion gain HCG corresponding to the first capacitance. Subsequently, the conversion signal reading part 211 reads a first read-out reset signal HCGRST in a second reset read-out period, and the first read-out reset signal HCGRST is input into the signal holding part 220 through the internal signal line LSGN1, sampled by the second sampling transistor SHS1-Tr, and held in the second signal holding capacitor CS21. The signal held in the second signal holding capacitor CS21 is subject to a first reset read-out operation, according to which the first read-out reset signal is processed in a predetermined manner.

The second reset read-out period is followed by a first transfer period, in which the conversion signal reading part 211 keeps the control signals TG1 and TG2 at the high level to keep the first and second transfer transistors TG11-Tr and TG12-Tr in the conduction state, so that the charges stored in the first and second photodiodes PD11 and PD12 are transferred to the floating diffusion FD11. After the first transfer period, the control signals TG1 and TG2 are switched to the low level to switch the first and second transfer transistors TG11-Tr and TG12-Tr into the non-conduction state. The second reset read-out period is followed by the first transfer period, which is followed by a first read-out period. In the first read-out period, the conversion signal reading part 211 reads a first read-out luminance signal HCGSIG, and the first read-out luminance signal HCGSIG is input into the signal holding part 220 through the internal signal line LSGN1, sampled by the third sampling transistor SHR2-Tr, and held in the third signal holding capacitor CR22. The signal held in the third signal holding capacitor CR22 is subject to a first luminance signal read-out operation, according to which the first read-out luminance signal is processed in a predetermined manner.

After this, the reading part 70 switches the storage transistor SG11-Tr into the conduction state, so that the storage capacitor CS11 is connected to the floating diffusion FD11. In this way, the gain of the floating diffusion FD11 is switched to the second conversion gain LCG corresponding to the second capacitance.

The first read-out period is followed by a second transfer period, in which the conversion signal reading part 211 keeps the control signals TG1 and TG2 at the high level to keep the first and second transfer transistors TG11-Tr and TG12-Tr in the conduction state, so that the charges stored in the first and second photodiodes PD11 and PD12 are transferred to the floating diffusion FD11. After the second transfer period, the control signals TG1 and TG2 are switched to the low level to switch the first and second transfer transistors TG11-Tr and TG12-Tr into the non-conduction state. The second transfer period is followed by a second read-out period. In the second read-out period, the conversion signal reading part 211 reads a second read-out luminance signal LCGSIG, and the second read-out luminance signal LCGSIG is input into the signal holding part 220 through the internal signal line LSGN1, sampled by the fourth sampling transistor SHS2-Tr, and held in the fourth signal holding capacitor CS22. The signal held in the fourth signal holding capacitor CS22 is subject to a second luminance signal read-out operation, according to which the second read-out luminance signal is processed in a predetermined manner.

As described above, in the solid-state imaging device 10 relating to the first embodiment, the pixel part 20 includes the pixels 200 arranged in a matrix pattern, and each pixel 200 includes the photoelectric conversion reading part 210 and the signal holding part 220. The solid-state imaging device 10 is capable of operating in a global shutter (GS) mode and having an autofocus (AF) function. The photoelectric conversion reading part 210 includes the first photodiode PD11 serving as the first photoelectric conversion element for storing charges generated by photoelectric conversion during an integration period, the second photodiode PD12 serving as the second photoelectric conversion element for storing charges generated by photoelectric conversion during an integration period, and the single microlens for allowing light to enter at least the photoelectric conversion regions of the first and second photodiodes PD11 and PD12.

In the first embodiment, the photoelectric conversion reading part 210 includes the first transfer transistor TG11-Tr serving as the first transfer element, the second transfer transistor TG12-Tr serving as the second transfer element, and the floating diffusion FD11. The charges stored in the first photodiode PD11 can be transferred through the first transfer transistor TG11-Tr in a transfer period following the integration period. The charges stored in the second photodiode PD12 can be transferred through the second transfer transistor TG12-Tr in a transfer period following the integration period. At least one of (i) the charges stored in the first photodiode PD11 or (ii) the charges stored in the second photodiode PD12 can be transferred to the floating diffusion FD11 respectively via the first transfer transistor TG11-Tr and the second transfer transistor TG12-Tr. Furthermore, the photoelectric conversion reading part 210 includes the conversion signal reading part 211, which can change the capacitance of the floating diffusion FD11 between the first capacitance and the second capacitance, so that the conversion gain can be changed between the first conversion gain corresponding to the first capacitance (for example, high gain conversion: HCG) and the second conversion gain corresponding to the second capacitance (for example, low conversion gain: LCG). Here, the conversion is performed with the conversion gain to produce a voltage signal, and the voltage signal is amplified and then output to the internal signal line LSGN1.

Under the control of the reading part 70, the photoelectric conversion reading part 210 is capable of reading the pixel signal VSL in the autofocus mode MDAF, the image capturing mode MDIC, and the dual conversion gain read-out mode MDDCG. In the autofocus mode MDAF, the reading part 70 controls driving of the conversion signal reading part 211 such that the conversion signal reading part 211 keeps the first and second transfer transistors TG11-Tr and TG12-Tr in the conduction state in different transfer periods, and separately performs a read-out operation on the pixel signal corresponding to the charges stored in the first photodiode PD11 and a read-out operation on the pixel signal corresponding to the charges stored in the second photodiode PD12 with the first conversion gain HCG or second conversion gain LCG. In the image capturing mode MDIC and the dual conversion gain read-out mode MDDCG, the reading part 70 controls driving of the conversion signal reading part 211 such that the conversion signal reading part 211 keeps the first and second transfer transistors TG11-Tr and TG12-Tr in the conduction state in the same transfer period and performs a read-out operation on a pixel signal corresponding to the combination of the charges stored in the first photodiode PD11 and the charges stored in the second photodiode PD12 with the first conversion gain HCG and subsequently with the second conversion gain LCG.

The signal holding part 220 is configured to capture and hold the pixel signal, which is the voltage signal read onto the in-pixel signal line LSGN1 by the conversion signal reading part 211. In the first embodiment, the signal holding part 220 includes the sample-and-hold circuit 230 configured to capture and hold, in response to a sampling signal, the voltage signal corresponding to the charges stored in the first and second photodiodes PD11 and PD12 that have been transferred to the floating diffusion FD11 of the photoelectric conversion reading part 210. The voltage signal is a pixel signal read out onto the internal signal line.

With the above-described configurations, the first embodiment can accomplish higher dynamic range by performing the read-out operation in a predetermined mode while the pixels achieve a small size.

In other words, the first embodiment is capable not only of achieving advanced global shutter and autofocus functions, but also of sufficiently exhibiting single exposure high dynamic range (SEHDR) performance, thereby substantially realizing high dynamic range.

Second Embodiment

Figure 13:
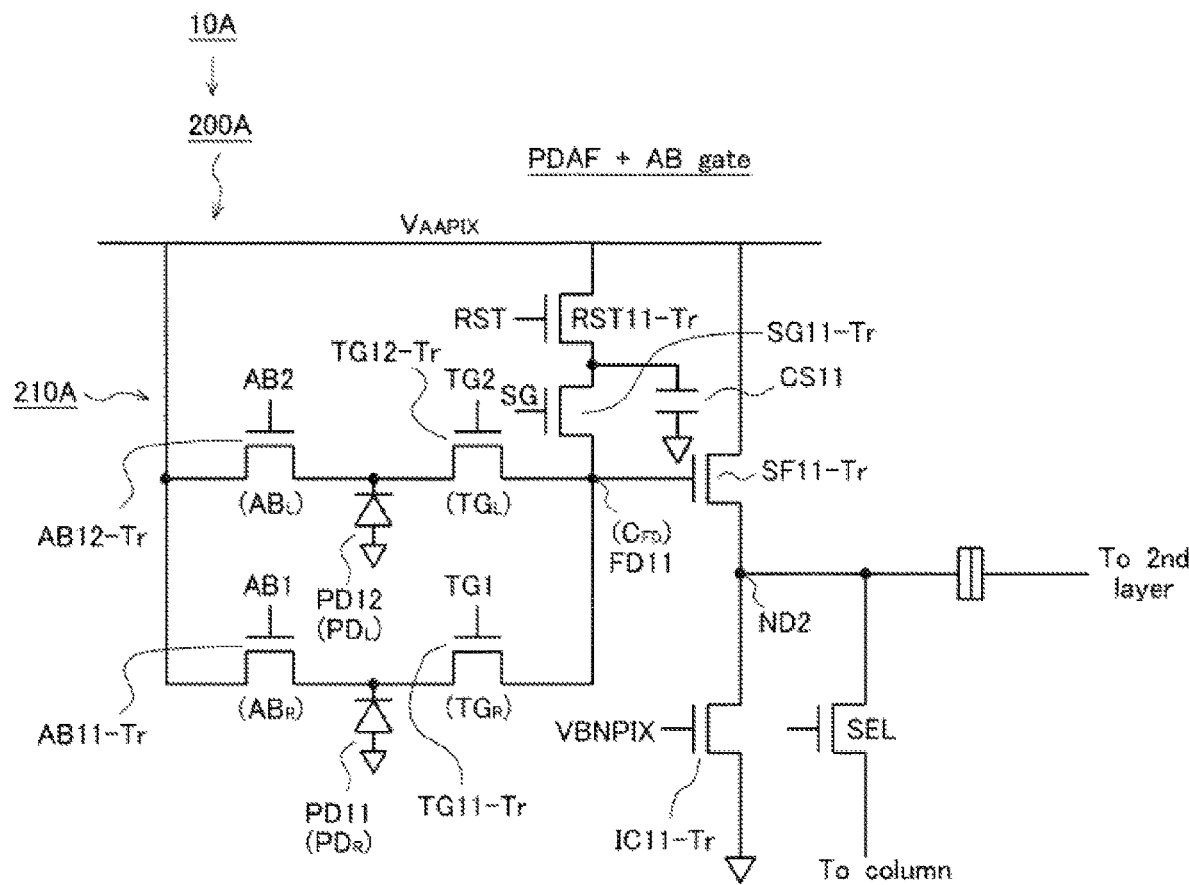
FIG. 13 is a circuit diagram showing an example configuration of the main part of a photoelectric conversion reading part in a pixel of a solid-state imaging device relating to a second embodiment of the present invention, where the photoelectric conversion reading part includes two photodiodes and two shutter gates.
Figure 14A:
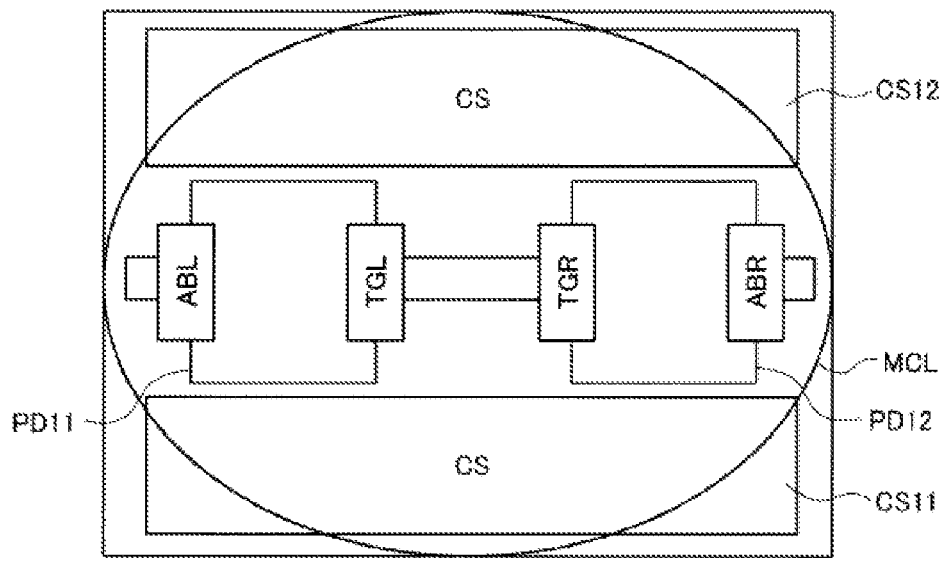
FIGS. 14A and 14B show an example of how to arrange the two diodes and the two shutter gates in the second embodiment of the present invention.
Figure 14B:
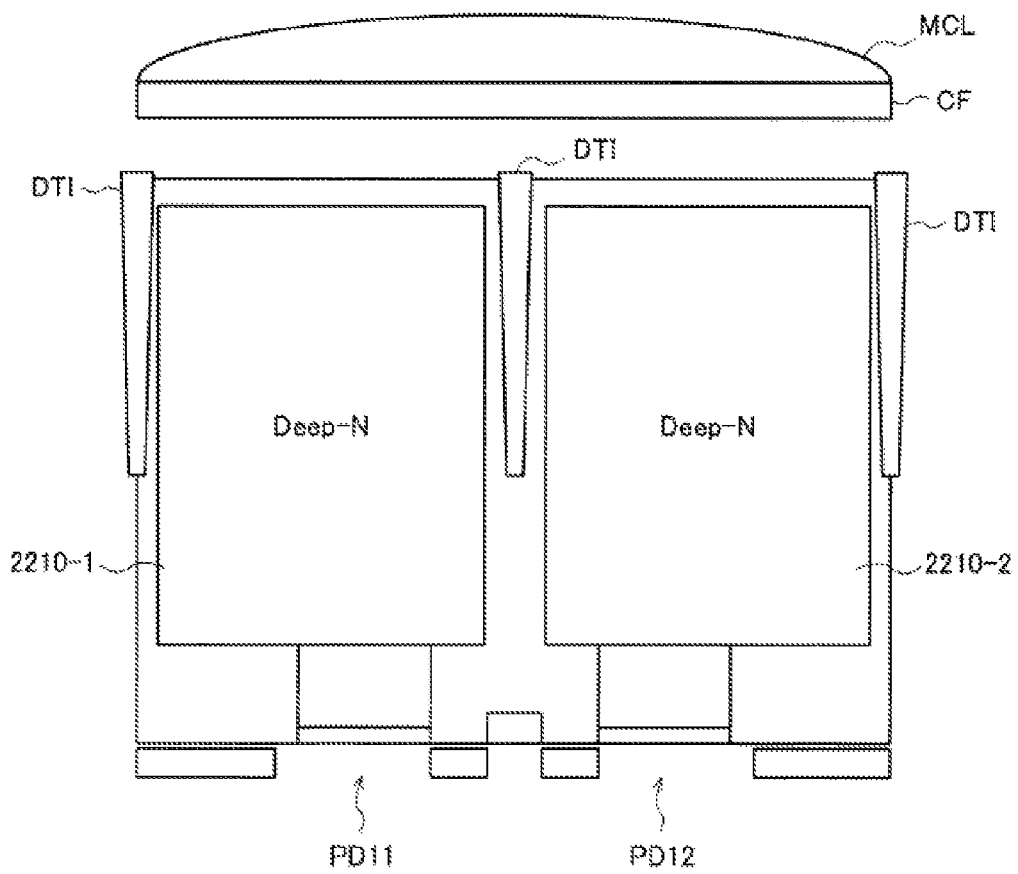
Figure 15:
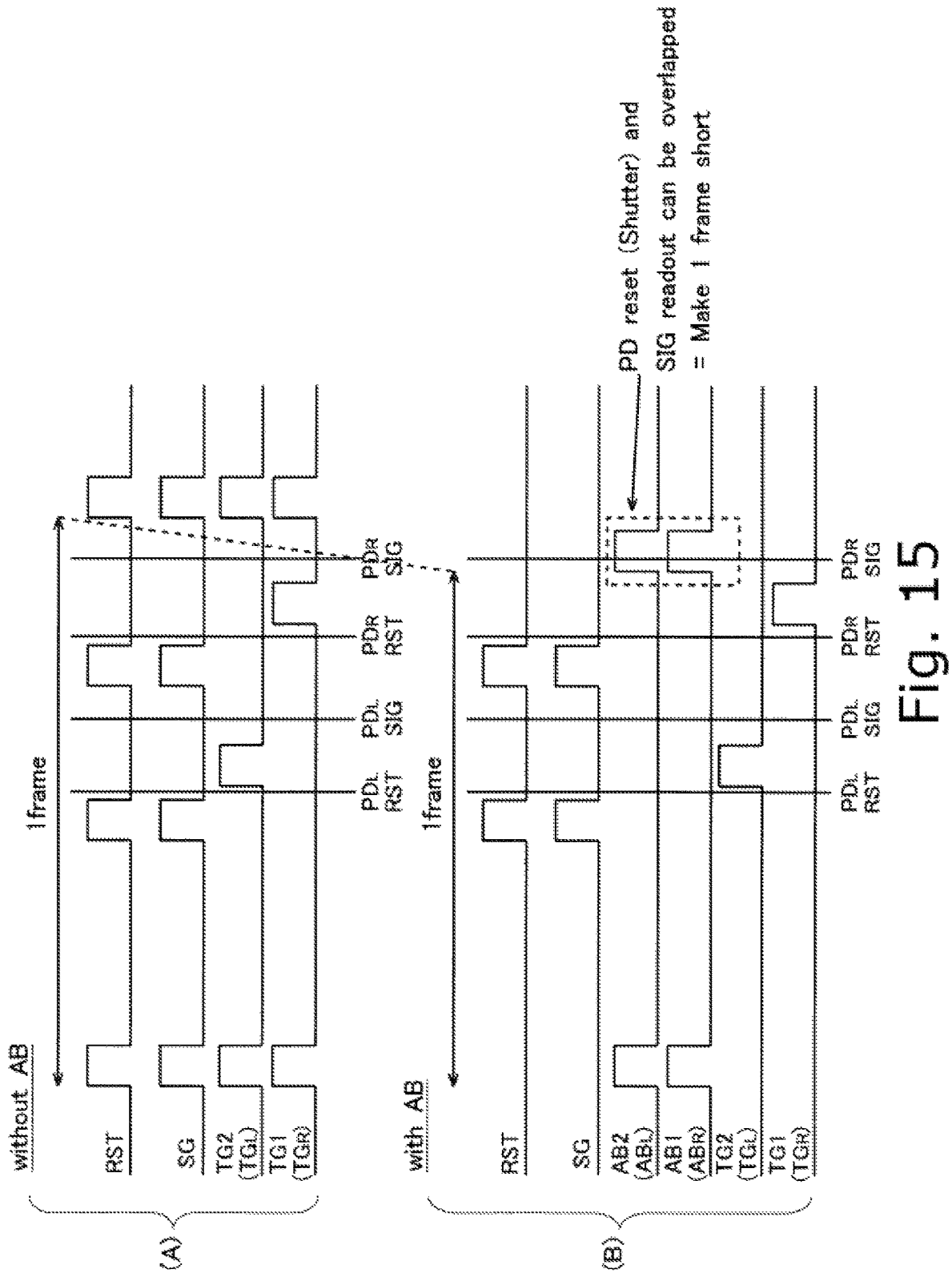
FIG. 15 is used to illustrate effects, in terms of a sequence of operations for read-out, produced by the second embodiment of the present disclosure where the two shutter gates are provided, in comparison with the effects produced in a case where no shutter gates are provided.

FIG. 13 is a circuit diagram showing an example configuration of the main part of a photoelectric conversion reading part in a pixel of a solid-state imaging device relating to a second embodiment of the present invention, where the photoelectric conversion reading part includes two photodiodes and two shutter gates. FIGS. 14A and 14B show an example of how to arrange the two diodes and the two shutter gates in the second embodiment of the present invention. FIG. 15 includes views (A) and (B) used to illustrate effects produced by a sequence of operations performed to read the pixel signal in the second embodiment of the present disclosure or when the two shutter gates are arranged, in comparison with the effects produced in a case where no shutter gates are provided. In FIG. 15, the view (A) is a timing chart showing the drive signals (control signals) for the pixel when no shutter gates are provided, and the view (B) shows a timing chart for the drive signals (control signals) for the pixel when the shutter gates are provided. FIGS. 16A and 16B are used to illustrate the effects relating to the potential transition produced by the second embodiment of the present disclosure where two shutter gates are provided, in comparison with the effects produced in a case where no shutter gates are provided. FIG. 16A shows the potential transition in the parts in the pixel when no shutter gates are provided, and FIG. 16B shows the potential transition in the parts in the pixel when the shutter gates are provided.

A pixel 200A of a solid-state imaging device 10A relating to the second embodiment differs from the pixel 200 of the solid-state imaging device 10 relating to the above-described first embodiment in the following points.

In the solid-state imaging device 10A relating to the second embodiment, a photoelectric conversion reading part 210A of the pixel 200A includes first and second shutter gate transistors AB11-Tr and AB12-Tr for allowing two diodes PD11 and PD12 to discharge charges. More specifically, the photoelectric conversion reading part 210A relating to the second embodiment includes a first shutter gate transistor AB11-Tr connected to the first photodiode PD11 (PDR)

serving as the first photoelectric conversion element. The first shutter gate transistor AB11-Tr is configured to allow the first photodiode PD11 (PDR) to discharge charges toward the region other than the region where the floating diffusion FD11 is formed, for example, to the power supply potential VAAPIX. The photoelectric conversion reading part 210A further has a second shutter gate transistor AB12-Tr connected to the first photodiode PD12 (PDL) serving as the second photoelectric conversion element. The second shutter gate transistor AB12-Tr is configured to allow the second photodiode PD12 (PDL) to discharge charges toward the region other than the region where the floating diffusion FD11 is formed, for example, to the power supply potential VAAPIX.

The first shutter gate transistor AB11-Tr of the photoelectric conversion reading part 210A is controlled by a control signal AB1 applied to the gate thereof through a control line. The first shutter gate transistor AB11-Tr remains selected and in the conduction state during a period in which the control signal AB1 is at the high (H) level, so that the charges (electrons) produced by conversion in the first photodiode PD11 and stored in the first photodiode PD11 can be discharged to the power supply potential VAAPIX.

The second shutter gate transistor AB12-Tr of the photoelectric conversion reading part 210A is controlled by a control signal AB2 applied to the gate thereof through a control line. The second shutter gate transistor AB12-Tr remains selected and in the conduction state during a period in which the control signal AB2 is at the high (H) level, so that the charges (electrons) produced by conversion in the second photodiode PD12 and stored in the second photodiode PD12 can be discharged to the power supply potential VAAPIX.

Although the first and second shutter gate transistors AB11-Tr and AB12-Tr can be driven and controlled individually, the respective shutter gates are controlled to remain in the conduction state in an overlapping manner in each frame in the second embodiment, as shown in the timing charge in the view (B) in FIG. 15. In other words, the second embodiment can advantageously complete the read-out operation within a shorter period by one frame since the reset (shutter) operation performed on the photodiodes PD11 and PD12 is allowed to overlap the read-out operation of the signal SIG from the photodiodes PD11 and PD12. In addition, the second embodiment can prevent overflowing during the read-out phase.

The following further describes how overflowing can be prevented during the read-out phase with reference to FIGS. 16A and 16B. When the first and second shutter gate transistors AB11-Tr and AB12-Tr are not provided or in the so-called LOFIC structure, the charges overflow from the PDs to the FD as shown in FIG. 16A. In the PDAF phase, when the photodiodes PDs have charges beyond the well capacity, the overflowing charges from the first to-be-read PD (in this case: PD11, PDR) to the floating diffusion FD11 during the read-out operation result in signal detection errors.

To address this issue, the first and second shutter gate transistors AB11-Tr and AB12-Tr are provided. As a result, the AB gates can serve as shutter gates, thereby controlling the overflowing charges (electrons), as shown in FIG. 16B.

Third Embodiment

Figure 17:
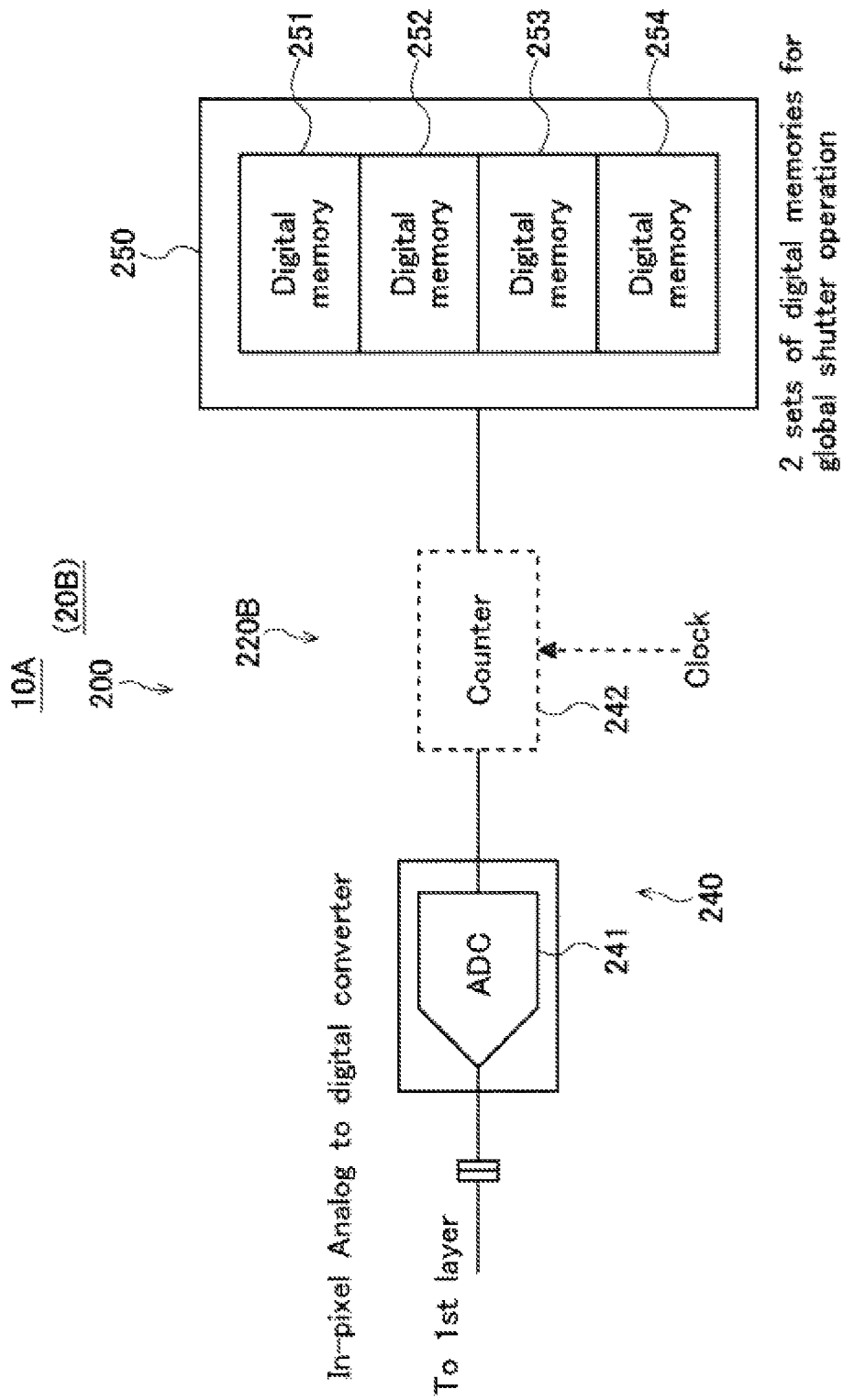
FIG. 17 is a block diagram showing an example basic configuration of a pixel in a solid-state imaging device relating to a third embodiment of the present invention.
Figure 18:
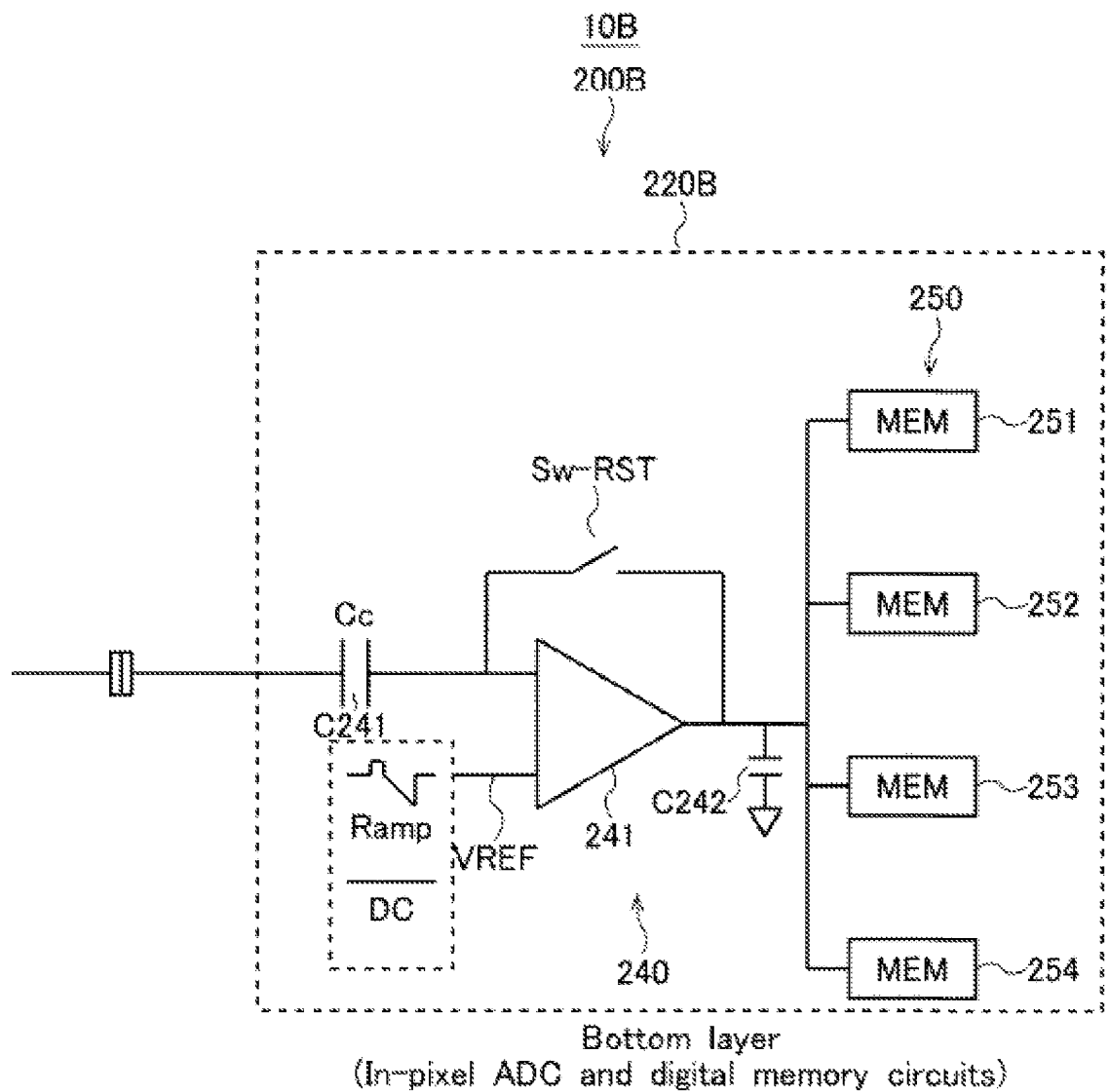
FIG. 18 is a circuit diagram showing an example configuration of an AD conversion part shown in FIG. 17.

FIG. 17 is a circuit diagram showing an example configuration of the main part of a digital pixel of a solid-state imaging device relating to a third embodiment of the present invention. FIG. 18 is a circuit diagram showing an example configuration of an AD conversion part shown in FIG. 17.

A pixel 200B of a solid-state imaging device 10B relating to the third embodiment differs from the pixel 200 of the solid-state imaging device 10 relating to the above-described first embodiment in the following points.

In the solid-state imaging device 10B relating to the third embodiment, the pixel part 20B includes digital pixels, and each digital pixel includes a photoelectric conversion reading part 210B and a signal holding part 220B. The signal holding part 220B is configured as a stacked CMOS image sensor including an analog-to-digital (AD) converting part and a memory part and capable of operating in a global shutter mode. In the solid-state imaging device 10B relating to the third embodiment, each digital pixel DP is capable of performing AD conversion, and the AD converting part 240 includes a comparator 241 for performing a comparing operation of comparing the voltage signal read by the photoelectric conversion reading part against a referential voltage and outputting a digital comparison result signal. Under the control of the reading part 70, the comparator 241 is capable of performing a first comparing operation and a second comparing operation. The first comparing operation is designed to output a digital first comparison result signal obtained by processing the voltage signal corresponding to the overflow charges that overflow from the photoelectric conversion element to the output node (floating diffusion) in an integration period. The second comparing operation is designed to output a digital second comparison result signal obtained by processing the voltage signal corresponding to the charges stored in the photoelectric conversion element that are transferred to the output node in a transfer period following the integration period.

The AD converting part 40 further includes a counter 242, and the counter 242 is connected to a memory part 250 including memories 251 to 254.

The photoelectric conversion reading part 210 of the digital pixel 200B is configured in the same manner as shown in FIG. 2. Therefore, the photoelectric conversion reading part 210 is not described in detail here.

The AD converting part 240 of the digital pixel 200B compares the analog voltage signal VSL output from the photoelectric conversion reading part 210 against the referential voltage VREF, which has a ramp waveform varying with a predetermined gradient or a fixed voltage level, to convert the analog signal into a digital signal.

As shown in FIG. 18, the AD converting part 240 includes a comparator (COMP) 241, an input-side coupling capacitor C241, an output-side load capacitor C242, and a reset switch SW-RST.

In the comparator 241, a first input terminal or inversion input terminal (−) receives the voltage signal VSL fed thereto, which is output from the conversion signal reading part 211 of the photoelectric conversion reading part 210 to the internal signal line LSGN1, and a second input terminal or non-inversion input terminal (+) receives the referential voltage VREF fed thereto. The comparator 241 performs a comparing operation of comparing the voltage signal VSL against the referential voltage VREF and outputting a digital comparison result signal SCMP.

The first input terminal or inversion input terminal (−) of the comparator 241 is connected to the coupling capacitor C241. In this way, the conversion signal reading part 211 of the photoelectric conversion reading part 210 formed on the first substrate 110 is AC coupled to the input part of the comparator 241 of the AD converting part 240 formed on the second substrate 120, so that the noise can be reduced and high SNR can be achieved when the illuminance is low.

As for the comparator 241, the reset switch SW-RST is connected between the output terminal and the first input terminal or inversion input terminal (−), and the load capacitor C242 is connected between the output terminal and the reference potential VSS.

In the AD converting part 240, basically, the comparator 241 compares the analog signal (the potential VSL) read from the conversion signal reading part 211 of the photoelectric conversion reading part 210 to the signal line LSGN1 against the referential voltage VREF, for example, a ramp signal RAMP that linearly changes with a certain gradient or has a slope waveform. During the comparison, the counter 242, which is provided for each pixel similarly to the comparator 241, is operating. The ramp signal RAMP having a ramp waveform and the value of the counter vary in a one-to-one correspondence, so that the voltage signal VSL is converted into a digital signal. Basically, the AD converting part 240 converts a change in voltage, in other words, a change in the referential voltage VREF (for example, the ramp signal RAMP) into a change in time, and counts the change in time at certain intervals (with certain clocks). In this way, a digital value is obtained. When the analog signal VSL and the ramp signal RAMP (the referential voltage VREF) cross each other, the output from the comparator 241 is inverted and the clock input into the counter 242 is stopped, or the suspended clock is input into the counter 242 and the value (data) of the counter 242 at that timing is saved in the memory part 250. In this way, the AD conversion is completed. After the end of the above-described AD converting period, the data (signal) stored in the memory part 250 of each digital pixel 200B is output through the output circuit to a signal processing circuit (not shown) and subject to predetermined signal processing, so that a two-dimensional image is produced.

The third embodiment can produce the same effects as the above-described first embodiment.

Examples of Application to Electronic Apparatuses

The solid-state imaging devices 10, 10A, 10B described above can be applied, as an imaging device, to electronic apparatuses such as digital cameras, video cameras, mobile terminals, surveillance cameras, and medical endoscope cameras.

Figure 19:
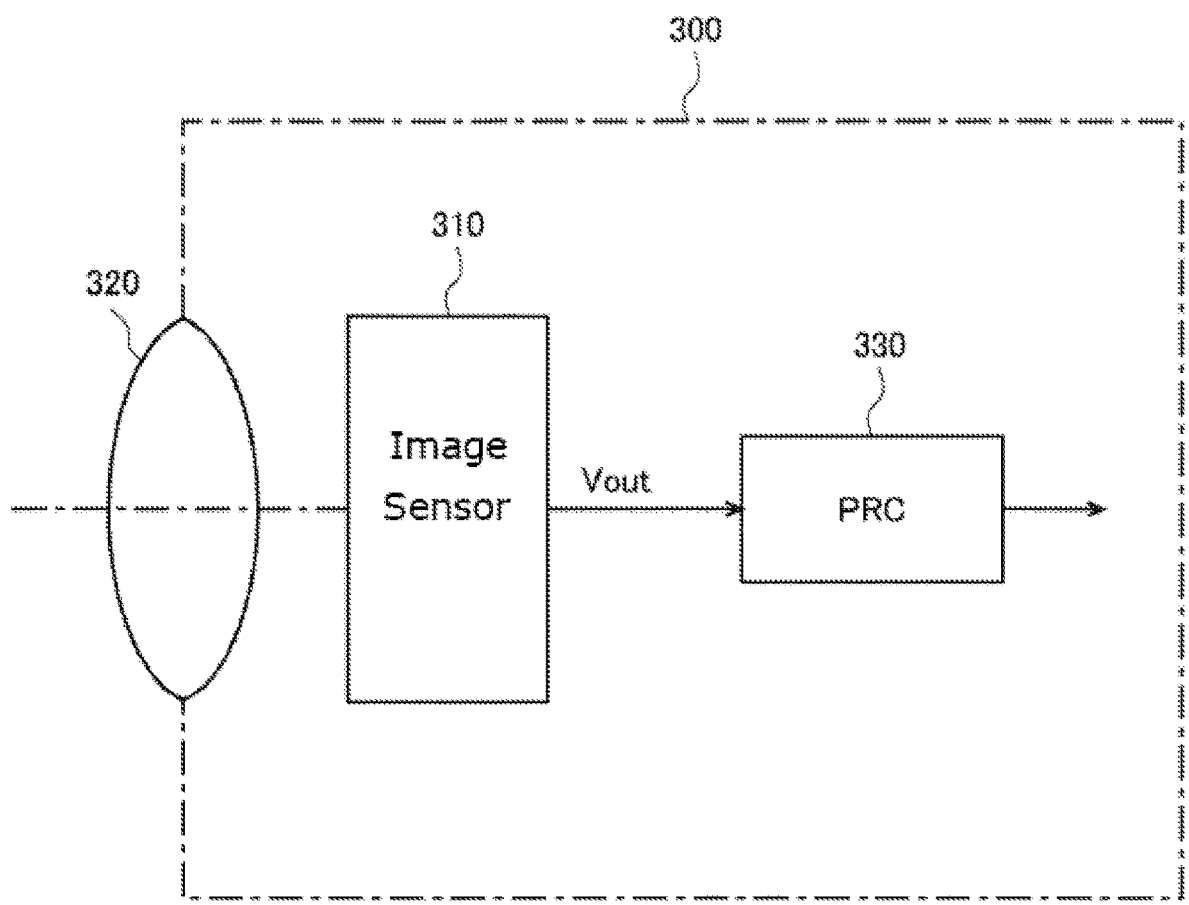
FIG. 19 shows an example configuration of an electronic apparatus to which the solid-state imaging devices relating to the embodiments of the present disclosure can be applied.

FIG. 19 shows an example configuration of an electronic apparatus including a camera system to which the solid-state imaging devices according to the embodiments of the present invention can be applied.

As shown in FIG. 19, an electronic apparatus 300 includes a CMOS image sensor 310 that can be constituted by any one of the solid-state imaging devices 10, 10A and 10B relating to the embodiments of the present invention. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes any one of the solid-state imaging devices 10, 10A and 10B as the CMOS image sensor 310. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
    a pixel part having pixels arranged therein, each pixel including a photoelectric conversion reading part and a signal holding part; and
    a reading part for reading pixel signals from the pixel part, wherein the photoelectric conversion reading part includes:
        a first photoelectric conversion element for storing therein, in an integration period, charges generated by photoelectric conversion;
        a second photoelectric conversion element for storing therein, in the integration period, charges generated by photoelectric conversion;
        a single microlens for allowing light to enter at least a photoelectric conversion region of the first photoelectric conversion element and a photoelectric conversion region of the second photoelectric conversion element;
        a first transfer element for transferring, in a transfer period following the integration period, the charges stored in the first photoelectric conversion element;
        a second transfer element for transferring, in a transfer period following the integration period, the charges stored in the second photoelectric conversion element;
        a floating diffusion to which at least one of (i) the charges stored in the first photoelectric conversion element or (ii) the charges stored in the second photoelectric conversion element are transferred respectively through the first transfer element and the second transfer element; and
        a conversion signal reading part for changing a capacitance of the floating diffusion between a first capacitance and a second capacitance to change a conversion gain between a first conversion gain corresponding to the first capacitance and a second conversion gain corresponding to the second capacitance, the conversion signal reading part being configured to amplify a signal resulting from conversion with the conversion gain and output the amplified signal,
    wherein the signal holding part is configured to capture and hold a pixel signal read onto an in-pixel signal line by the conversion signal reading part, the pixel signal being the amplified signal,
    wherein the reading part is configured to read the pixel signal at least in an autofocus mode and in an image capturing mode,
    wherein the reading part controls driving of the conversion signal reading part such that the conversion signal reading part:
        in the autofocus mode, keeps the first and second transfer elements in a conduction state in different transfer periods, and separately performs a read-out operation on a pixel signal corresponding to the charges stored in the first photoelectric conversion element and a read-out operation on a pixel signal corresponding to the charges stored in the second photoelectric conversion element with the first conversion gain or the second conversion gain; and in the image capturing mode, keeps the first and second transfer elements in a conduction state in a same transfer period, and performs a read-out operation on a pixel signal corresponding to a sum of the charges stored in the first photoelectric conversion element and the charges stored in the second photoelectric conversion element with the first conversion gain and subsequently with the second conversion gain.

2. The solid-state imaging device of claim 1,
wherein the photoelectric conversion reading part includes:
a reset element for resetting, in a reset period, the floating diffusion to a predetermined potential;
a source follower element for amplifying the signal produced by conversion performed by the floating diffusion and outputting the amplified signal;
a storage connecting element connected to the floating diffusion; and
a storage capacitance element for storing overflow charges flowing toward the floating diffusion via the storage connecting element, and
wherein, in the image capturing mode, the reading part:
keeps the reset element, the storage connecting element, the first transfer element, and the second transfer element in a conduction state for a predetermined period of time so that the floating diffusion, the storage capacitance element, the first photoelectric conversion element, and the second photoelectric conversion element are reset, and switches the first transfer element and the second transfer element into a non-conduction state so that an exposure period starts; and
subsequently sequentially performs a first conversion gain reset read-out operation, a first conversion gain signal read-out operation, a second conversion gain signal read-out operation and a second conversion gain reset read-out operation.

3. The solid-state imaging device of claim 2, wherein, in the image capturing mode, the reading part:
switches the storage connecting element to a non-conduction state to disconnect the storage capacitance element from the floating diffusion, so that charges in the floating diffusion are separated from charges in the storage capacitance element to set a gain of the floating diffusion to the first conversion gain corresponding to the first capacitance;
in a first reset read-out period, performs the first conversion gain reset read-out operation of reading from the source follower element a first read-out reset signal produced through conversion with the first conversion gain corresponding to the first capacitance of the floating diffusion and processing the first read-out reset signal in a predetermined manner;
in a first read-out period following a first transfer period following the first reset read-out period, performs the first-conversion-gain signal read-out operation of reading from the source follower element a first read-out signal produced through conversion with the first conversion gain corresponding to the first capacitance of the floating diffusion and processing the first read-out signal in a predetermined manner;

subsequently keeps the storage connecting element in a conduction state for a predetermined period of time to connect the storage capacitance element to the floating diffusion, so that the charges in the floating diffusion and the charges in the storage capacitance element relating to the overflow charges are combined together to switch the gain of the floating diffusion to the second conversion gain corresponding to the second capacitance;
in a second read-out period following a second transfer period following the first read-out period, performs the second conversion gain signal read-out operation of reading from the source follower element a second read-out signal produced through conversion with the second conversion gain corresponding to the second capacitance of the floating diffusion and processing the second read-out signal in a predetermined manner; and
after using the reset element to reset the floating diffusion, performs the second conversion gain reset read-out operation of reading from the source follower element a second reset signal produced through conversion with the second conversion gain corresponding to the second capacitance of the floating diffusion and processing the second reset signal in a predetermined manner.

4. The solid-state imaging device of claim 1,
wherein the reading part is configured to read the pixel signal in a dual conversion gain read-out mode,
wherein the photoelectric conversion reading part includes:
a reset element for resetting, in a reset period, the floating diffusion to a predetermined potential;
a source follower element for amplifying the signal produced by conversion performed by the floating diffusion and outputting the amplified signal;
a storage connecting element connected to the floating diffusion; and
a storage capacitance element for storing overflow charges flowing toward the floating diffusion via the storage connecting element, and
wherein, in the dual conversion gain read-out mode, the reading part:
keeps the reset element, the storage connecting element, the first transfer element, and the second transfer element in a conduction state for a predetermined period of time so that the floating diffusion, the storage capacitance element, the first photoelectric conversion element, and the second photoelectric conversion element are reset, and switches the first transfer element and the second transfer element into a non-conduction state so that an exposure period starts; and
subsequently sequentially performs a second conversion gain reset read-out operation, a first conversion gain reset read-out operation, a first conversion gain signal read-out operation and a second conversion gain signal read-out operation.

5. The solid-state imaging device of claim 4, wherein, in the dual conversion gain read-out mode, the reading part:
resets the floating diffusion through the reset element in a reset period that starts after a predetermined period of time elapses after the start of the exposure period;
keeps the storage connecting element in a conduction state for a predetermined period of time to connect the storage capacitance element to the floating diffusion, so that the gain of the floating diffusion is switched to the second conversion gain corresponding to the second capacitance;

in a first reset read-out period, performs the second conversion gain reset read-out operation of reading from the source follower element a second read-out reset signal produced through conversion with the second conversion gain corresponding to the second capacitance of the floating diffusion and processing the second read-out reset signal in a predetermined manner;

switches the storage connecting element to a non-conduction state to disconnect the storage capacitance element from the floating diffusion, so that a capacitance in the floating diffusion is separated from a capacitance in the storage capacitance element to switch the gain of the floating diffusion to the first conversion gain corresponding to the first capacitance;

in a second reset read-out period following the first reset read-out period, performs the first conversion gain reset read-out operation of reading from the source follower element a first read-out reset signal produced through conversion with the first conversion gain corresponding to the first capacitance of the floating diffusion and processing the first read-out reset signal in a predetermined manner;

in a first read-out period following a first transfer period following the second reset read-out period, performs the first conversion gain signal read-out operation of reading from the source follower element a first read-out signal produced through conversion with the first conversion gain corresponding to the first capacitance of the floating diffusion and processing the first read-out signal in a predetermined manner; and after the first conversion gain signal read-out operation, switches the storage connecting element into a conduction state to connect the storage capacitance element to the floating diffusion, so that the gain of the floating diffusion is switched to the second conversion gain corresponding to the second capacitance; and in a second read-out period following a second transfer period following the first read-out period, performs a second conversion gain signal read-out operation of reading from the source follower element a second read-out signal produced through conversion with the second conversion gain corresponding to the second capacitance of the floating diffusion and processing the second read-out signal in a predetermined manner.

6. The solid-state imaging device according to claim 1, wherein (i) a first photoelectric conversion region of the first photoelectric conversion element connected to the first transfer element and (ii) a second photoelectric conversion region of the second photoelectric conversion element connected to the second transfer element are arranged such that the first and second transfer elements face each other and are adjacent to each other in a row, column or diagonal direction of the pixels.

7. The solid-state imaging device of claim 6,
wherein the photoelectric conversion reading part includes:
a storage connecting element connected to the floating diffusion; and
a storage capacitance element for storing overflow charges flowing toward the floating diffusion via the storage connecting element, and
wherein the storage capacitance element is arranged in parallel with the first and second photoelectric conversion regions.

8. The solid-state imaging device of claim 1,
wherein the photoelectric conversion reading part includes:
a reset element for resetting, in a reset period, the floating diffusion to a predetermined potential;
a source follower element for amplifying the signal produced through conversion performed by the floating diffusion and outputting the amplified signal;
a storage connecting element connected to the floating diffusion; and
a storage capacitance element for storing overflow charges flowing toward the floating diffusion via the storage connecting element,
wherein, in the autofocus mode, the reading part:
keeps the reset element, the storage connecting element, the first transfer element, and the second transfer element in a conduction state for a predetermined period of time so that the floating diffusion, the storage capacitance element, the first photoelectric conversion element, and the second photoelectric conversion element are reset, and switches the first transfer element and the second transfer element into a non-conduction state so that an exposure period starts;
subsequently keeps the reset element and the storage connecting element in a conduction state for a predetermined period of time to reset the floating diffusion;
switches the storage connecting element to a non-conduction or conduction state to set the gain of the floating diffusion to the first or second conversion gain;
for the charges stored in the first or second photoelectric conversion element,
in a first reset read-out period, performs a first reset read-out operation of reading a first read-out reset signal and processing the first read-out reset signal in a predetermined manner;
in a first read-out period following a first transfer period following the first reset read-out period, performs a first signal read-out operation of reading a first read-out signal and processing the first read-out signal in a predetermined manner;
subsequently keeps the reset element and the storage connecting element in a conduction state for a predetermined period of time to reset the floating diffusion;
switches the storage connecting element into a non-conduction or conduction state to set the gain of the floating diffusion to the first or second conversion gain;
for the charges stored in the second or first photoelectric conversion element,
in a second reset read-out period, performs a second reset read-out operation of reading a second read-out reset signal and processing the second read-out reset signal in a predetermined manner; and
in a second read-out period following a second transfer period following the second reset read-out period, performs a second signal read-out operation of reading a second read-out signal and processing the second read-out signal in a predetermined manner.

9. The solid-state imaging device of claim 1, wherein the photoelectric conversion reading part includes:
a first overflow path formed in a layer deeper at least than a channel formation region of the first transfer element, the first overflow path being configured to allow charges to overflow from the first photoelectric conversion element toward a region where the floating diffusion is formed; and
a second overflow path formed in a layer deeper at least than a channel formation region of the second transfer element, the second overflow path being configured to allow charges to overflow from the second photoelectric conversion element toward the region where the floating diffusion is formed.

10. The solid-state imaging device of claim 1, wherein the photoelectric conversion reading part includes:
   a first shutter gate connected to the first photoelectric conversion element, the first shutter gate being configured to allow charges to be discharged from the first photoelectric conversion element toward a region other than a region where the floating diffusion is formed; and
   a second shutter gate connected to the second photoelectric conversion element, the second shutter gate being configured to allow charges to be discharged from the second photoelectric conversion element toward a region other than the region where the floating diffusion is formed.

11. The solid-state imaging device of claim 1, wherein the signal holding part includes a sample-and-hold circuit configured to capture and hold, in response to a sampling signal, the pixel signal read onto the in-pixel signal line, the pixel signal being the amplified signal corresponding to the charges stored in the first and second photoelectric conversion elements that are transferred to the floating diffusion.

12. The solid-state imaging device of claim 1, wherein the signal holding part includes:
   a comparator for comparing the pixel signal read onto the in-pixel signal line against a reference voltage to analog-to-digital (AD) convert the read pixel signal and outputting a digital comparison result signal, the pixel signal being the amplified signal; and
   a memory for holding the comparison result signal produced by the comparator based on the signal corresponding to the charges stored in the first and second photoelectric conversion elements that are transferred to the floating diffusion.

13. A method for driving a solid-state imaging device, the solid-state imaging device including:
   a pixel part having pixels arranged therein, each pixel including a photoelectric conversion reading part and a signal holding part; and
   a reading part for reading pixel signals from the pixel part, wherein the photoelectric conversion reading part includes:
      a first photoelectric conversion element for storing therein, in an integration period, charges generated by photoelectric conversion;
      a second photoelectric conversion element for storing therein, in the integration period, charges generated by photoelectric conversion;
      a single microlens for allowing light to enter at least a photoelectric conversion region of the first photoelectric conversion element and a photoelectric conversion region of the second photoelectric conversion element;
      a first transfer element for transferring, in a transfer period following the integration period, the charges stored in the first photoelectric conversion element;
      a second transfer element for transferring, in a transfer period following the integration period, the charges stored in the second photoelectric conversion element;
      a floating diffusion to which at least one of (i) the charges stored in the first photoelectric conversion element or (ii) the charges stored in the second photoelectric conversion element are transferred respectively through the first transfer element and the second transfer element; and
   a conversion signal reading part for changing a capacitance of the floating diffusion between a first capacitance and a second capacitance to change a conversion gain between a first conversion gain corresponding to the first capacitance and a second conversion gain corresponding to the second capacitance, the conversion signal reading part being configured to amplify a signal resulting from conversion with the conversion gain and output the amplified signal,
   wherein the signal holding part is configured to capture and hold a pixel signal read onto an in-pixel signal line by the conversion signal reading part, the pixel signal being the amplified signal,
   wherein the reading part is configured to read the pixel signal at least in an autofocus mode and in an image capturing mode,
   wherein, in the autofocus mode, the first and second transfer elements are kept in a conduction state in different transfer periods, and a read-out operation on a pixel signal corresponding to the charges stored in the first photoelectric conversion element and a read-out operation on a pixel signal corresponding to the charges stored in the second photoelectric conversion element are separately performed with the first conversion gain or the second conversion gain, and
   wherein, in the image capturing mode, the first and second transfer elements are kept in a conduction state in a same transfer period, and a read-out operation is performed on a pixel signal corresponding to a sum of the charges stored in the first photoelectric conversion element and the charges stored in the second photoelectric conversion element with the first conversion gain and subsequently with the second conversion gain.

14. An electronic apparatus comprising:
   a solid-state imaging device; and
   an optical system for forming a subject image on the solid-state imaging device,
      wherein the solid-state imaging device includes:
      a pixel part having pixels arranged therein, each pixel including a photoelectric conversion reading part and a signal holding part; and
      a reading part for reading a pixel signal from the pixel part,
         wherein the photoelectric conversion reading part includes:
         a first photoelectric conversion element for storing therein, in an integration period, charges generated by photoelectric conversion;
         a second photoelectric conversion element for storing therein, in the integration period, charges generated by photoelectric conversion;
         a single microlens for allowing light to enter at least a photoelectric conversion region of the first photoelectric conversion element and a photoelectric conversion region of the second photoelectric conversion element;
         a first transfer element for transferring, in a transfer period following the integration period, the charges stored in the first photoelectric conversion element;

a second transfer element for transferring, in a transfer period following the integration period, the charges stored in the second photoelectric conversion element;

a floating diffusion to which at least one of (i) the charges stored in the first photoelectric conversion element or (ii) the charges stored in the second photoelectric conversion element are transferred respectively through the first transfer element and the second transfer element; and a conversion signal reading part for changing a capacitance of the floating diffusion between a first capacitance and a second capacitance to change a conversion gain between a first conversion gain corresponding to the first capacitance and a second conversion gain corresponding to the second capacitance, the conversion signal reading part being configured to amplify a signal resulting from conversion with the conversion gain and output the amplified signal, wherein the signal holding part is configured to capture and hold a pixel signal read onto an in-pixel signal line by the conversion signal reading part, the pixel signal being the amplified signal, wherein the reading part is configured to read the pixel signal at least in an autofocus mode and in an image capturing mode, wherein the reading part controls driving of the conversion signal reading part such that the conversion signal reading part:

in the autofocus mode, keeps the first and second transfer elements in a conduction state in different transfer periods, and separately performs a read-out operation on a pixel signal corresponding to the charges stored in the first photoelectric conversion element and a read-out operation on a pixel signal corresponding to the charges stored in the second photoelectric conversion element with the first conversion gain or the second conversion gain; and in the image capturing mode, keeps the first and second transfer elements in a conduction state in a same transfer period, and performs a read-out operation on a pixel signal corresponding to a sum of the charges stored in the first photoelectric conversion element and the charges stored in the second photoelectric conversion element with the first conversion gain and subsequently with the second conversion gain.

* * * * *